(12) United States Patent
Matsunami et al.

(10) Patent No.: US 6,775,830 B1
(45) Date of Patent: Aug. 10, 2004

(54) COMPUTER SYSTEM AND A PROGRAM INSTALL METHOD THEREOF

(75) Inventors: Naoto Matsunami, Sagamihara (JP); Yoichi Mizuno, Fujisawa (JP); Hideki Kamimaki, Fujisawa (JP); Jun Matsumoto, Tokyo (JP); Akira Yamamoto, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 373 days.

(21) Appl. No.: 09/666,062

(22) Filed: Sep. 19, 2000

(30) Foreign Application Priority Data

Sep. 24, 1999 (JP) .......................................... 11-269868

(51) Int. Cl.[7] .............................................. G06F 9/445
(52) U.S. Cl. ...................... 717/176; 717/177; 717/178; 717/174; 717/175
(58) Field of Search ............................... 717/174, 176, 717/177, 175, 178

(56) References Cited

U.S. PATENT DOCUMENTS

| | | | | |
|---|---|---|---|---|
| 4,780,821 A | * | 10/1988 | Crossley ..................... 709/100 |
| 5,239,643 A | * | 8/1993 | Blount et al. ................ 707/102 |
| 5,732,281 A | * | 3/1998 | Summers et al. ............... 710/8 |
| 5,757,642 A | * | 5/1998 | Jones ............................. 714/4 |
| 5,860,012 A | * | 1/1999 | Luu ............................ 717/176 |
| 5,881,236 A | * | 3/1999 | Dickey ........................ 717/176 |
| 5,890,218 A | * | 3/1999 | Ogawa et al. .............. 711/148 |
| 5,931,909 A | * | 8/1999 | Taylor ......................... 717/176 |
| 6,067,582 A | * | 5/2000 | Smith et al. ................. 717/177 |
| 6,094,531 A | * | 7/2000 | Allison et al. .............. 717/176 |
| 6,144,992 A | * | 11/2000 | Turpin et al. ................ 717/178 |
| 6,178,551 B1 | * | 1/2001 | Sana et al. ................... 717/174 |
| 6,195,678 B1 | * | 2/2001 | Komuro ...................... 709/202 |
| 6,202,206 B1 | * | 3/2001 | Dean et al. .................. 717/177 |
| 6,233,618 B1 | * | 5/2001 | Shannon ...................... 709/225 |
| 6,289,512 B1 | * | 9/2001 | Edwards et al. ............ 717/178 |
| 6,470,380 B1 | * | 10/2002 | Yoshizawa et al. ......... 711/147 |

* cited by examiner

*Primary Examiner*—Todd Ingberg
*Assistant Examiner*—Qamrun Nahar
(74) *Attorney, Agent, or Firm*—Antonelli, Terry, Stout & Kraus, LLP

(57) ABSTRACT

A computer system including a plurality of computers, a management console operated by the operator to install a program in the computers and a storage subsystem coupled to the computers and the management console is disclosed. The storage subsystem includes a first storage unit shared by the computers and a plurality of second storage units exclusively used by the computers respectively. The first storage unit has stored therein a file related to the program installed in the computers and an installer program for executing the work of installing a program. The second storage units have each stored therein an install agent executed by each computer and a control file accessed by the install agent. The management console includes an install manager for starting the execution of the install agent on each computer. The install manager starts the process according to the install agent on each computer by switching on the power supply of each computer. The install agent, once the process thereof is started, starts the installer program in accordance with the contents of the control file. The installer program reads a related file from the first storage unit, and transfers it to the second storage unit exclusive to the corresponding computer thereby to install the program.

28 Claims, 18 Drawing Sheets

FIG.4

| PORT NO. | TARGET ID | VIRTUAL LUN | INTERNAL LUN | WWN | S_ID | ATTRIBUTE |
|---|---|---|---|---|---|---|
| 0 | 0 | 0 | 0 | WWNa | S_IDa | PRIVATE |
| 0 | 0 | 0 | 1 | WWNb | S_IDb | PRIVATE |
| ⋮ | ⋮ | ⋮ | ⋮ | ⋮ | ⋮ | ⋮ |
| 0 | 0 | 0 | 2 | WWNn | S_IDn | PRIVATE |
| 0 | 0 | 1 | k | WWNa | S_IDa | SHARED |
| 0 | 0 | 1 | k | WWNb | S_IDb | SHARED |
| ⋮ | ⋮ | ⋮ | ⋮ | ⋮ | ⋮ | ⋮ |
| 0 | 0 | 1 | k | WWNn | S_IDn | SHARED |
| 0 | 0 | 0 | k | WWNz | S_IDz | SHARED |

FIG.13

| CLIENT SITUATION | STATUS |
|---|---|
| POWER CONDITION | 2 |
| OS START CONDITION | 2 |
| INSTALL AGENT CONDITION | 2 |
| INSTALL CONDITION | 1 |
| SHUTDOWN CONDITION | 0 |

| CLIENT SITUATION \ STATUS | 0 | 1 | 2 | 3 |
|---|---|---|---|---|
| POWER SUPPLY CONDITION | OFF | * | ON | FAULT OCCURRED |
| OS START CONDITION | NOT YET STARTED | BEING STARTED | STARTED | FAULT OCCURRED |
| INSTALL AGENT CONDITION | OFF | * | ON | FAULT OCCURRED |
| INSTALL CONDITION | NOT YET STARTED | UNDER INSTALLATION | INSTALL OVER | FAULT OCCURRED |
| SHUTDOWN CONDITION | NOT YET STARTED | UNDER SHUTDOWN | SHUTDOWN OVER | FAULT OCCURRED |

COMPUTER SYSTEM AND A PROGRAM INSTALL METHOD THEREOF

BACKGROUND OF THE INVENTION

The present invention relates to a computer system and a method for installing a program in the computer system, or in particular to a method for installing a program in a plurality of computers.

An installer constituting a program for executing a series of install procedures, the very program to be installed and a removable recording medium such as a CD-ROM for storing the required install files are used for installing a program in a computer. In the prior art, the operator carries out the install work by mounting a recording medium in a storage unit such as a CD-ROM of the computer and executing the installer in the computer.

According to another method for installing a program in a computer, a program is installed from a file server connected to the computer through a network. In this method, install files are stored in a storage unit of a file server which is mountable as what is called a network disk from other computers. The operator activates a computer in which a program is to be installed and mounts the storage unit of the file server as a network disk. After that, the operator causes the installer stored in the storage unit of the file server to be executed in the computer, reads the other required files including the file of the program into the computer from the storage unit of the file server, and stores the files at appropriate positions of the storage unit such as a disk unit of the computer.

In the case of installing a program in a plurality of computers on a network, the operator carries out the aforementioned job for each computer. The disk unit of the file server can be shared by all the computers, and therefore the operator can start the installer in a plurality of computers substantially at the same time.

Generally, a removable recording medium has a low file transfer rate and therefore requires a longer time for the install work. In the case where a program is installed in a plurality of computers, the install work is required to be carried out the number of times equal to the number of the computers. Thus, the processing time is lengthened in proportion to the number of computers involved. It is possible to execute the install work for a plurality of computers in parallel by using a plurality of recording media. Nevertheless, the number of the recording media that can be made available is limited. In the case where many computers are involved, therefore, the repetitive processing is unavoidable. Even for executing the parallel processing, it is necessary to mount the recording medium, start the installer and perform various setting processes for each one of the computers, and therefore a plurality of operators are needed.

In the case where the install work is conducted through a network, on the other hand, the file transfer may be increased in speed more than when a removable recording medium is used. In executing the install work for a plurality of computers in parallel, however, the file transfer rate in the file server and the network forms a bottleneck, with the result that the required transfer rate cannot be obtained, thereby making it necessary to repeat the install work a plurality of times. Generally, the version-up of a program by improving the program function and correction of a fault is a common practice, which is accompanied by the program install work. For this reason, the personnel expenditure for the install work is a cause of an increased operation cost for maintaining and managing a computer system.

Another problem occurs in the case where the operator for carrying out the install work does not belong to the organization owning the computer. The entry of such a operator into the place where the computer exists is not desirable from the viewpoint of confidentiality. Also, method of the program install work varies from one program to another, and a vast length of the training period is required for all the operators to master all the program install methods. In the event that the operator is not skilled enough in a program install method, the secondary problem may occur including the requirement for the reinstall work due to the failure of the first install work and the destruction of the file in the disk unit.

SUMMARY OF THE INVENTION

The object of the invention is to provide a method of efficiently installing a program in the computers making up a computer system, which can reduce the operating cost for the maintenance and management of the computer system.

In order to achieve this object, according to one aspect of the invention, there is provided a method for installing a program in a plurality of computers constituting a computer system comprising a management console operated by the operator to perform the operation of installing a program in the computers and a storage subsystem connected to the computers and the management console. In this method, the processing of an install agent is started on each computer under the control of the management console. The install agent, once the processing thereof is started, loads in the computer the installer program stored in a first storage unit in the storage subsystem, and starts the program. The installer program, once started, executes the program installation after a file stored in the first storage unit and related to the program to be installed is transferred to a second storage unit used by the particular computer.

According to another aspect of the invention, there is provided a computer system comprising a plurality of computers, a management console operated by the operator to perform the operation of installing a program in the computers, and a storage subsystem connected to the computers and the management console. The storage subsystem includes a first storage unit shared by a plurality of the computers and a plurality of second storage units used exclusively by the computers, respectively. The first storage unit has stored therein a file related to the program to be installed in the computers and an installer program for carrying out the install work. The second storage units each has stored therein an install agent executed in each computer and a control file accessed by the install agent. The management console includes an install manager for starting the execution of the install agent on each computer. In a preferred mode for carrying out the invention, each computer includes a power control circuit for switching on the power supply thereof in response to an instruction from the install manager. By switching on the power supply of each computer, the install manager causes each computer to start the processing according to the install agent.

Once the processing is started, the install agent starts the installer program on the computer in accordance with the contents of the control file. The installer program reads a related file from the first storage unit and installs the program by transferring the file to the second storage unit exclusive to the particular computer.

BRIEF DESCRIPTION OF THE DRAWINGS

FIG. 4 is a diagram showing the structure of a table representing an example of a LUN management table.

FIG. 13 is a diagram showing a table structure representing an example a computer status table file.

FIG. 14 is a diagram for explaining the definition of the status set in the computer status table file.

DESCRIPTION OF THE EMBODIMENTS

First Embodiment

Figure 1:
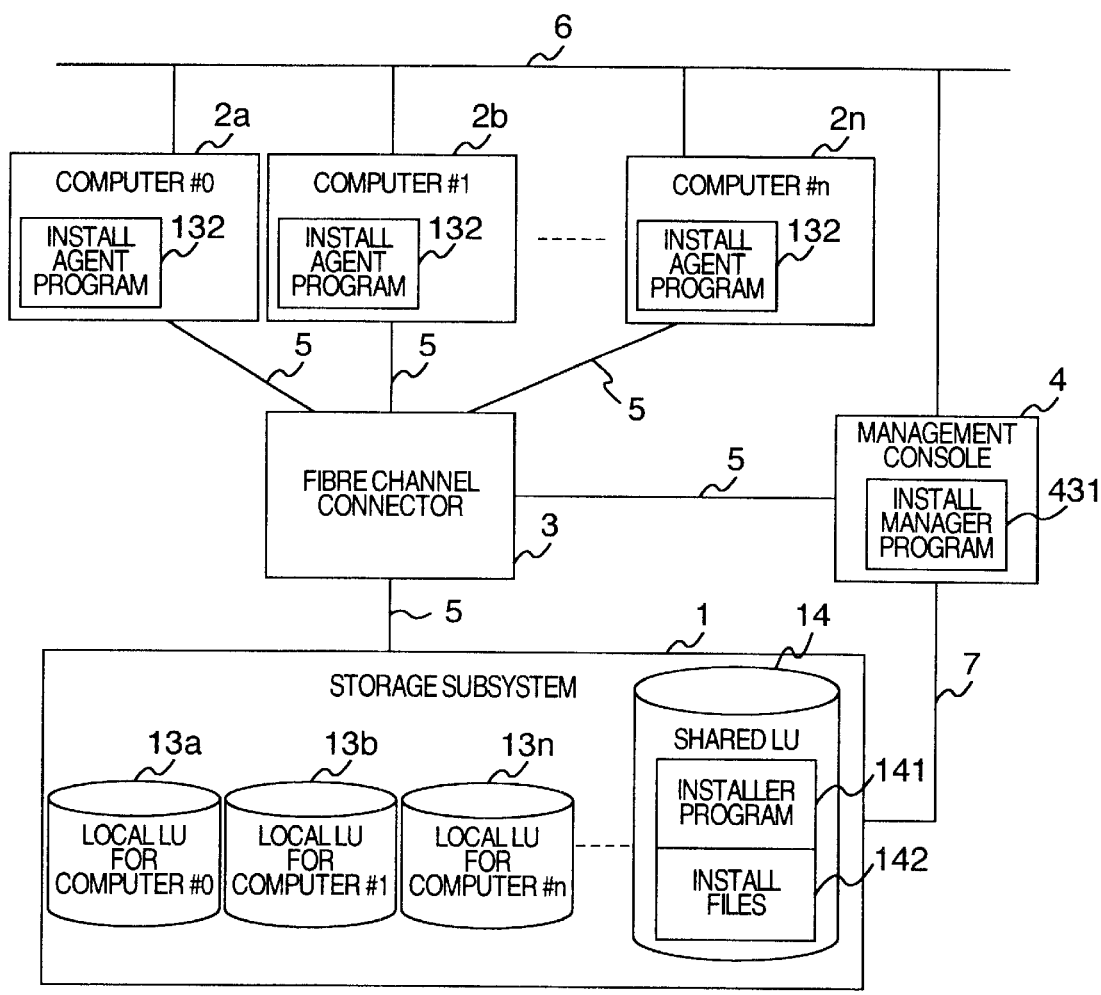
FIG. 1 is a simplified block diagram showing the configuration of a computer system according to an embodiment of the invention.

FIG. 1 is a simplified block diagram showing the configuration of a computer system according to an embodiment of the invention. The computer system according to this embodiment comprises a plurality of computers 2a, 2b, . . . , 2n (hereinafter designated only by reference numeral "2" for describing these computers collectively), a storage subsystem 1 shared by the computers 2, a management console 4 for managing the computer system, and a fibre channel connector 3 for connecting the computers 2, the management console 4 and the storage subsystem 1. The computers 2, the management console 3 and the storage subsystem 1 are connected with the fibre channel connector 3 by fibre channels 5. Each computer 2 and the management console 4 are interconnected communicably through a local area network (LAN) 6. The management console 4 and the storage subsystem 1 are connected by a communication path 7.

According to this embodiment, it is assumed that personal computers (PC) are used as the computers 2. Each computer 2 can of course be a server, a work station or the like computer. A fibre channel suitable from the viewpoint of both the connection distance and the speed is used as an interface (hereinafter referred to as I/F) for connecting each computer 2 and the storage subsystem 1. Nevertheless, an interface such as the smaller computer system interface (SCSI), the universal serial bus (USB) or the IEEE 1394 bus can alternatively be used with equal effect.

Figure 2:
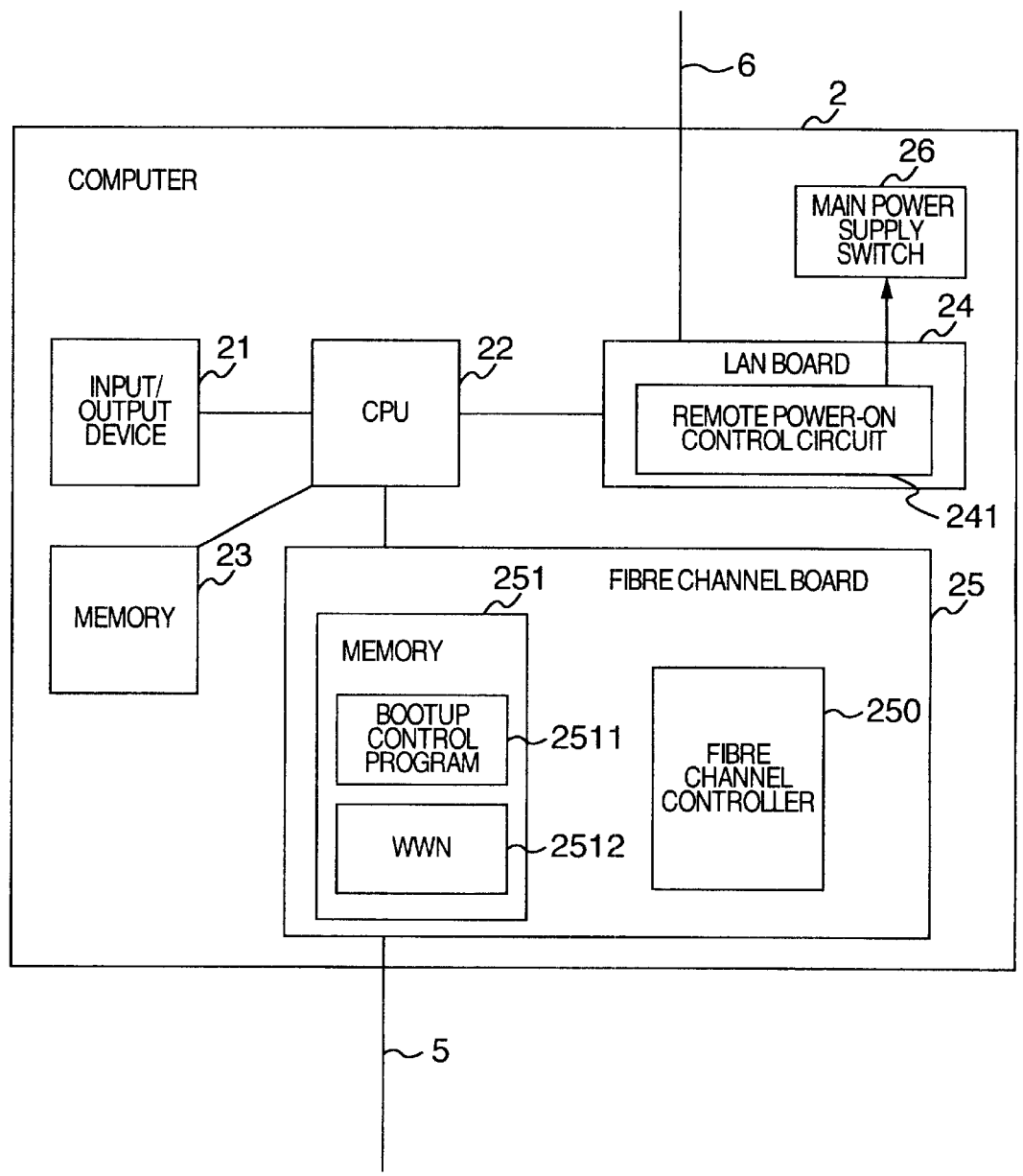
FIG. 2 is a simplified block diagram showing the configuration of a computer 2.

FIG. 2 is a simplified block diagram showing a configuration of the computer 2. Numeral 21 designates an input/output device for receiving the input of information or outputting the information, numeral 22 a central processing unit (CPU) for controlling the computers 2 as a whole, numeral 25 a fibre channel board mounted for connecting and controlling the fibre channel, numeral 24 a LAN board for performing communication through the LAN 6, and numeral 23 a memory for storing the programs and data required by the CPU 22 for executing various control operations. A plurality of programs are stored in the memory 23.

The fibre channel board 25 includes a fibre channel controller 250 for controlling the fibre channel, and a memory 251 for storing the programs and data required by the fibre channel controller to control the fibre channel and the programs and data required by the CPU 22 to control the fibre channel controller 250. The programs stored in the memory 251 include a bootup control program for the CPU 22 to control the fibre channel controller 250 and to load the OS from the storage subsystem 1 and start it. In addition to the bootup control program 2511, the memory 251 holds a world wide name (WWN) 2512 constituting information on the name set forth for uniquely identifying the fibre channel controller 250. According to this embodiment, the fibre channel controller 25 and the memory 251 are arranged on the board mounted on the computer 2. Nevertheless, these component parts can alternatively be mounted directly on the board carrying the CPU 22, etc., for example.

The LAN board 24 includes a remote power-on circuit 241 for controlling the main power switch 26 of the computer 2 to switch on/off the power of the computer 2 from outside of the computer 2.

Figure 3:
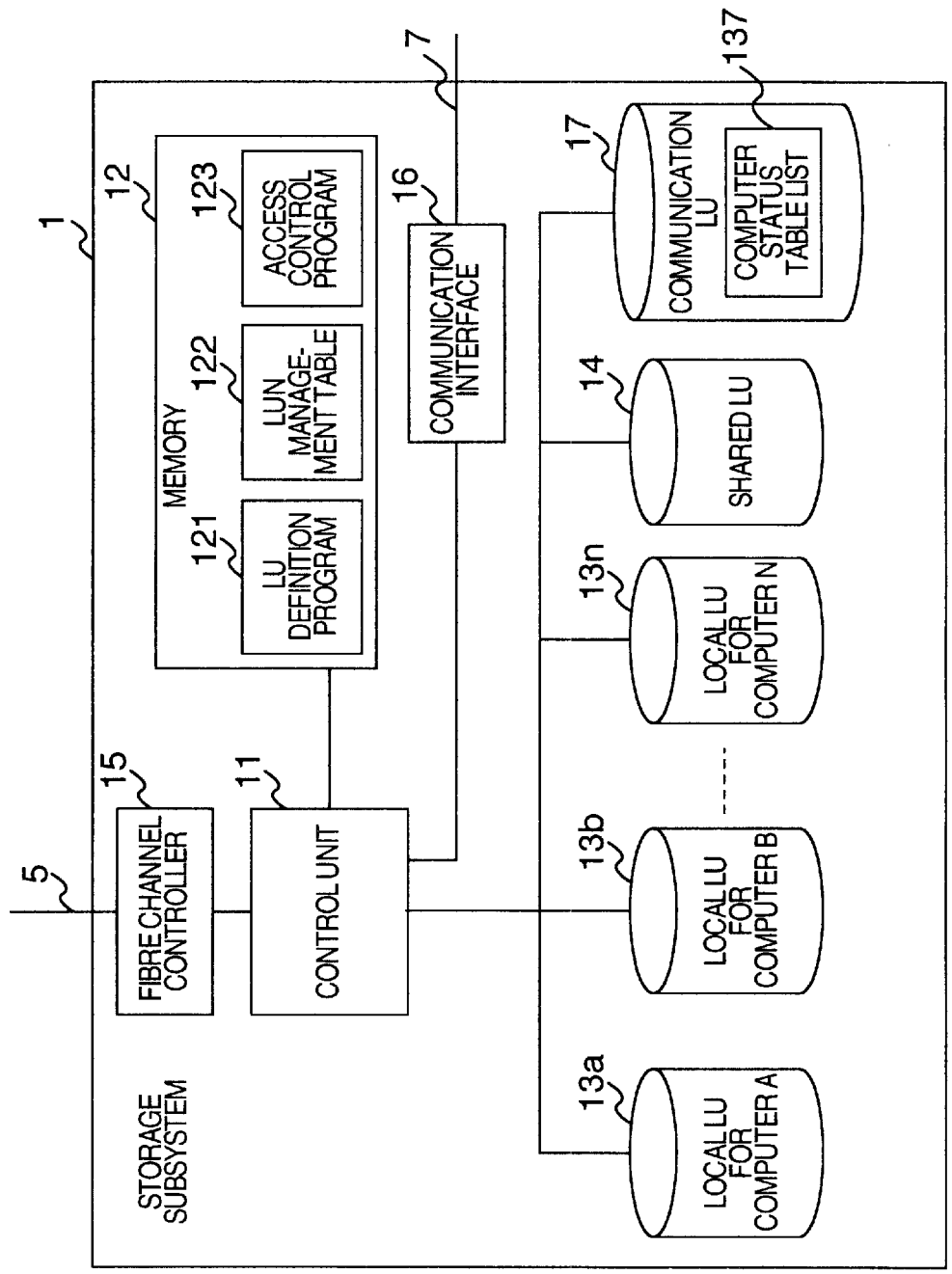
FIG. 3 is a simplified block diagram showing the configuration of a storage subsystem 1.

FIG. 3 is a simplified block diagram showing the configuration of the storage subsystem 1. The storage subsystem 1 includes a control unit 11 for controlling the storage subsystem 1 as a whole, a fibre channel controller 15 for connecting the fibre channel 5 and controlling the connection, a memory 12 for storing the programs and data used by the control unit 11 to control the storage subsystem 1, a communication interface 16 for controlling the communication with the management console 4, a plurality of logical units (LU) 13a, 13b, . . . ,13n and a shared LU 14. The communication LU 17 shown is not necessarily required in this embodiment, as will be explained later with reference to the second embodiment.

The logical units are a virtual volume (memory device) recognized by the computer 2, which recognizes one LU as one logical disk device. The logical unit is the name defined in the specification of the SCSI (small computer system interface) constituting one of the interfaces for connecting the computer and the storage subsystem. In the SCSI, the logical unit number (LUN) is attached to each logical unit as an identifier in order to identify each logical unit. In the portion of this specification that follows, the logical unit will be called simply as LU, and the logical unit number as LUN.

A plurality of LUs can be defined and constructed in the storage subsystem 1. The LU defined in the storage subsystem 1 is called an internal LU. A serial number which is an integer beginning with 0 is attached to each internal LU in order to manage the internal LUs in the storage subsystem 1. This number is called the internal LUN.

Each computer 2 is assigned a private LU 13 (hereinafter designated by "13" as a reference numeral whenever the discrimination of each of the logical units 13a, 13b, ..., 13n is not required) from among a plurality of LUs defined. In this specification, the LU 13 assigned to any one of the computers exclusively is also called a local LU. A LU 14, on the other hand, is shared and can be accessed by all the computers 2 and the management console 4. The LU shared by a plurality of computers will be called a shared LU in this specification. At the time of booting up the OS, the computer 2 searches the storage subsystem connected thereto and detects the LUNs thereof. Generally, the detection of the LUs by a computer such as the PC is accompanied under the restraints to the effect that (a) the LUNs are searched from 0 sequentially, and (b) the LUNs are assumed to exist in serial numbers and in the absence of a number, the search after the particular number is not conducted. According to this embodiment, each computer is caused to recognize a virtual LUN so that it can recognize only those LUNs of the LUs available for use in serial numbers beginning with zero. The LUNs recognized in virtual manner by the computer 2 will hereinafter be called the virtual LUNs. The correspondence between the internal LUNs and the virtual LUNs is managed by the LUN management table described later.

The memory 12 has stored therein a LU definition program 121 executed by the control unit 11 for defining and preparing the LUs, an access control program 123 executed by the control unit 11 for controlling the access to each LU from each computer 2 and a LUN management table 122 for storing the management information accessed by the control unit 11 at the time of controlling the access from each computer to the LUs.

FIG. 4 is a diagram showing a table structure representing an example of the LUN management table. The LUN management table 122 has a plurality of entries each corresponding to a set of an internal LU and a computer which can use the particular internal LU. Each entry has set therein a port number 1221, a target ID 1222, a virtual LUN 1223, an internal LUN 1224, a WWN 1225, a S_ID 1226 and an attribute 1227. These information are set through the management console 4 by the system manager at the time of preparing and defining the LU, for example.

The port number 1221 is the number attached to a connecting port of the fibre channel of the storage subsystem 1. According to this embodiment, the storage subsystem 1 is assumed to have one connection port and zero is stored for all the port numbers 1221.

The target ID 1222 is an identifier assigned to the storage subsystem 1 in the interface with the computer 2. In the case where a fibre channel is used as an interface connecting the computer 2 and the storage subsystem 1 as in the present embodiment, the D_ID (destination ID) attached to each port at the time of initialization can be used as the target ID 1222.

In the case where the SCSI is used as an interface, a plurality of IDs can be assigned to the same port. In such a case, the target ID associated with each LUN is set in this field. In the case where the interface is a fibre channel, the number and the D_ID of the connection port can be set in one-to-one relation, and therefore one of port number 1221 and the target ID 1222 can be done without. According to this embodiment, the fibre channel is used as an interface, and therefore it is assumed that the target ID 1221 is not used and zero is set for all the target IDs 1221.

The virtual LUN 1223 and the internal LUN 1224 hold the relation between the virtual LUN recognized by the computer 2 identified by the information set in the WWN 1225 and the internal LUN corresponding to the particular virtual LUN.

The WWN 1225 has set therein the WWN 2512 set in the fibre channel controller 250 of the computer 2. The WWN is the information given from each computer 2 at the time of the port log-in process for establishing the connection between the fibre channel ports.

The S_ID 1226 is the ID information set in the frame header of the fibre channel for identifying the source (initiator) that has prepared the frame. The S_ID is dynamically assigned at the time of initialization of the fibre channel. By relating WWN and S_ID to each other, the computer 2 can be specified by checking the S_ID without referring to WWN for each frame.

The attribute 1227 indicates the property of each LU. The word "private" indicates a LU assigned exclusively to one computer 2. The word "shared" indicates the fact a LU is shared by a plurality of the computers 2.

Assume that WWN of the computer 2a is WWNa and S_ID thereof is S_IDa, WWN of the computer 2b is WWNb and S_ID thereof is S_IDb, WWN of the computer 2n is WWNn and S_ID thereof is S_IDn, and WWN of the management console 4 is WWNz and S_ID thereof is S_IDz. From the LUN management table 122 shown in FIG. 4, it is understood that the computer 2a, for example, is assigned a LU with an internal LUN of 0 as a private local LU 13a and recognized as LU of LUN "0". In similar fashion, it is understood that the computer 2b is assigned LU with LUN of "1" as a private local LU and recognized as LU of LUN "0" from the computer 2b. It is also understood that the LU with the internal LUN "k" is the one shared by a plurality of computers and recognized as LU with LUN "1" from the computers 2a, 2b, 2n and as LU of "0" from the management console 4.

Figure 5:
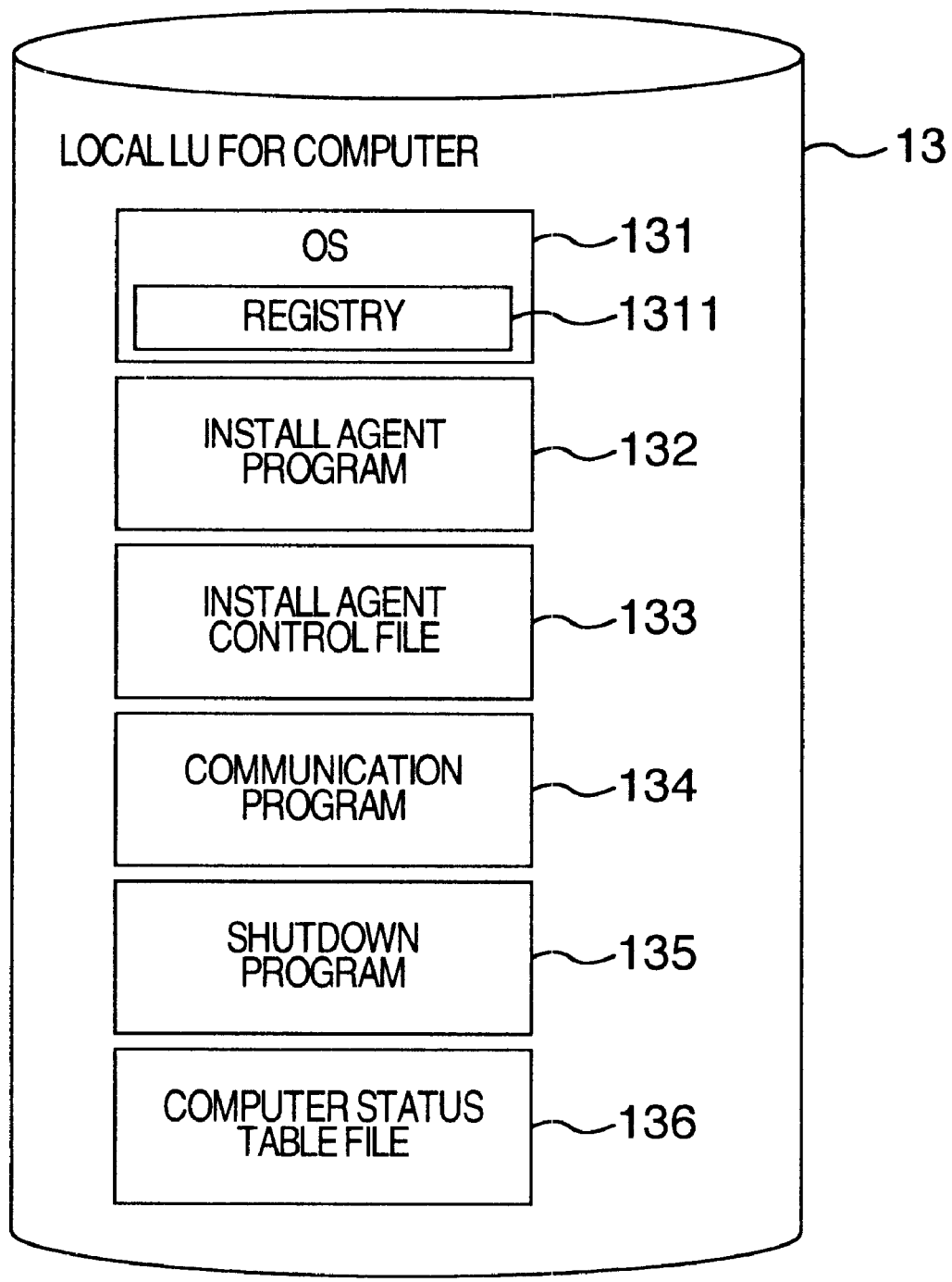
FIG. 5 is a diagram for explaining the programs and files stored in a local LU.

FIG. 5 is a diagram for explaining the programs, etc. stored in the local LU 13. The local LU 13 has stored therein the programs used by the computer 2 assigned the particular LU including an operating system (OS) 131, an install agent program (hereinafter referred to as the install agent) 132, a communication program 134 and a shutdown program 135. These programs are loaded in the memory 23 of the computer 2 and executed by the CPU 22.

The OS 131 is a program for executing various programs and controlling the hardware on the computer 2, and includes a registry 1311 for holding and managing the information on the setting and structure of the OS 131, the information on the programs executed by the computer 2 and the information on the user utilizing the particular computer 2. The install agent 132 is a program for starting the installer for installing a program and performing a part or the whole of the install work on behalf of the operator who has thus far conducted it. The communication program 134 is for controlling the communication with the management console 4 and reporting the progress of the install work and the occurrence of an error. The shutdown program 135 is for shutting down the computer 2.

In addition to the programs described above, the local LU 13 has stored therein an installer agent control file 133 holding the information for controlling the install agent 132, and a computer status table file 136 holding the information on the progress of the work for installing the program executed in the computer 2 and various status information including the success/failure of the work.

Figure 6:
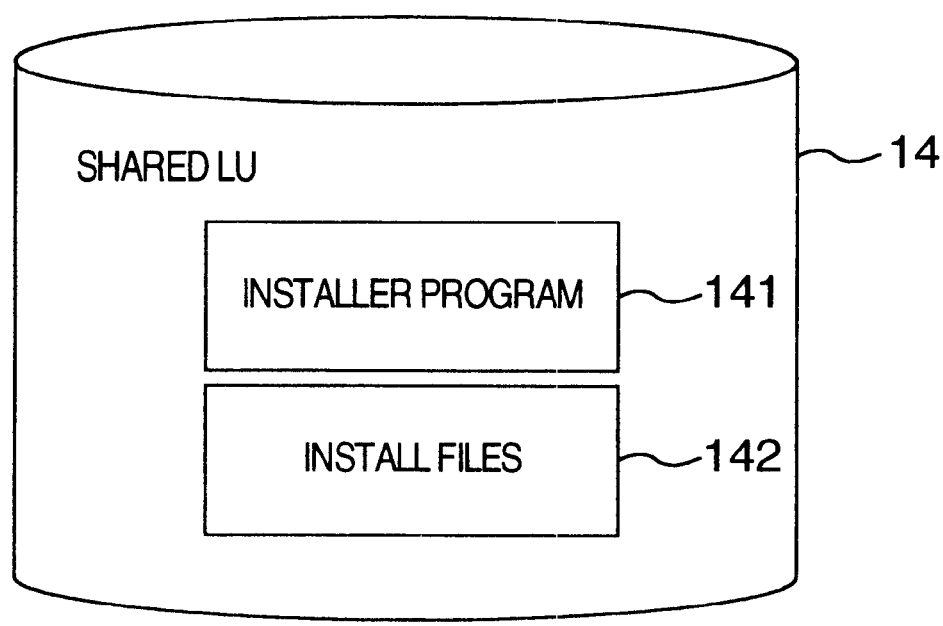
FIG. 6 is a diagram for explaining a program, etc. stored in a shared LU 14.

FIG. 6 is a diagram for explaining the program, etc. stored in the shared LU 14. The shared LU 14 has stored therein a program installer 141 and install files 142. The install files 142 include the files required for installing such as various setting files and the file for the program installed by the installer 141. The installer program 141 and the install files 142 are copied to the shared LU 14 from a removable medium such as a CD-ROM by the operator prior to the install work.

The installer program 141 is executed by being loaded in the memory 23 of the computer 2 by the install agent 132. The install files are accessed by the installer program 141 or copied to the local LU 13 of the computer 2 executing the installer program 141.

Figure 7:
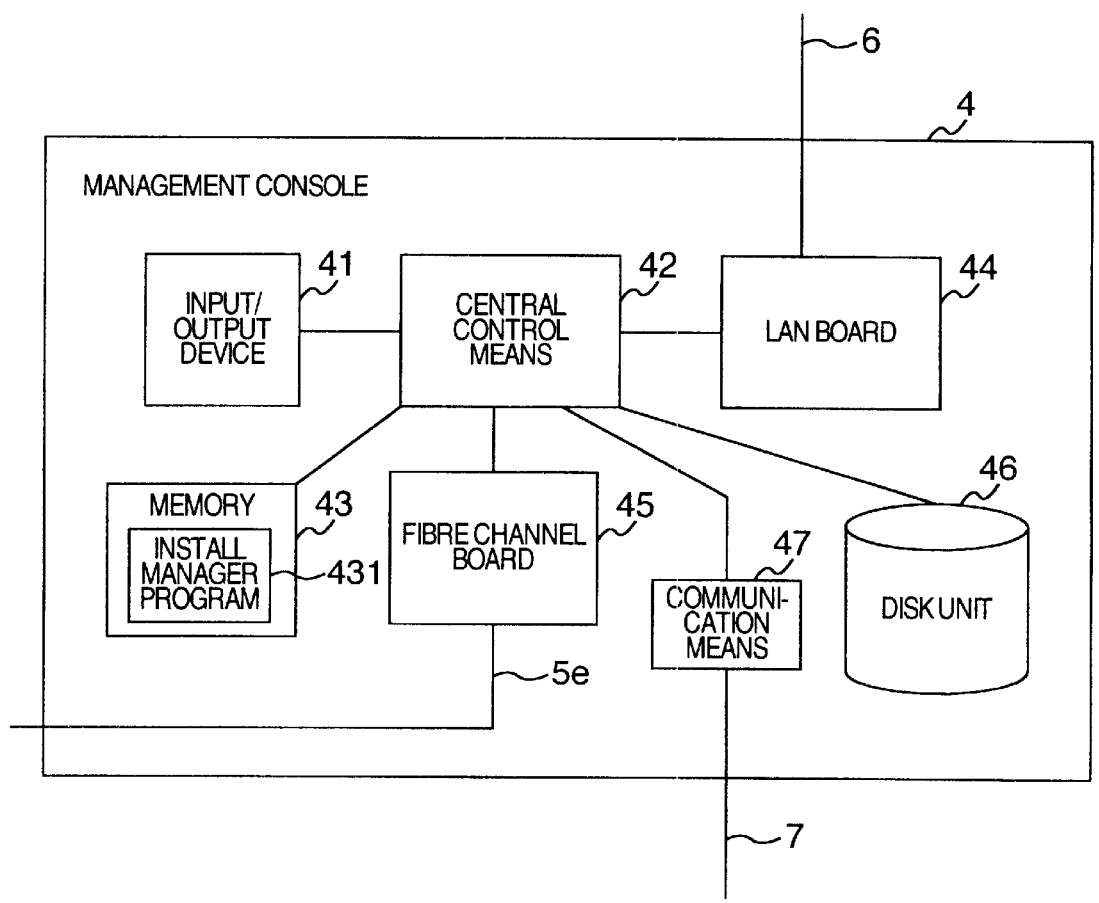
FIG. 7 is a simplified block diagram showing the configuration of a management console 4.

FIG. 7 is a simplified block diagram showing a configuration of the management console 4. The management console 4 includes an input/output device 41 by way of which the manager operates the management console 4, a CPU 42 for controlling the whole management console 4, a memory 43 for storing the program executed by the CPU 41 and the related data, a fibre channel board 45 for connecting and controlling the fibre channel 5, a LAN board 44 for performing the communication through the LAN 6, a disk unit 46 for storing the OS and the program for the management console 4 and a communication interface 47 for establishing communication with the storage subsystem 1.

The programs stored in the memory 43 include an install manager program (hereinafter referred to as the install manager) 431 for controlling the install work in general. The install manager 431 includes a plurality of subprograms described below.

Figure 8:
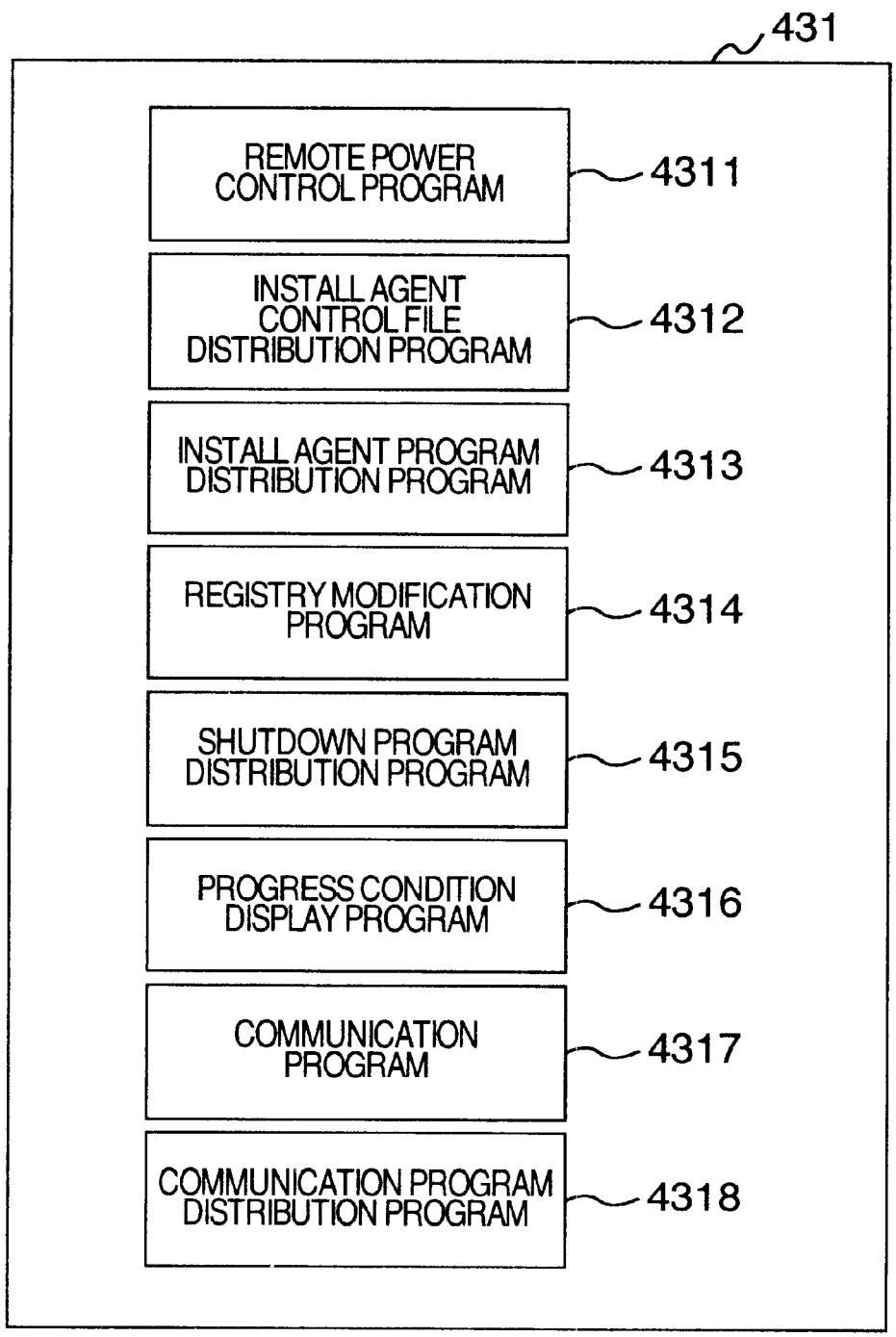
FIG. 8 is a schematic diagram showing the configuration of an install manager 431.

FIG. 8 is a schematic diagram showing a structure of the install manager 431. The install manager 431 includes a remote power control program 4311, an install agent control file distribution program 4312, an install agent distribution program 4313, a registry modification program 4314, a shutdown program distribution program 4315, a progress display program 4316, a communication program 4317 and a communication program distribution program 4318.

The remote power control program 4311 is for controlling the on/off state of the power supply and the rebooting of the computer 2 from a remote place. The install agent control file distribution program 4312 is for distributing the install agent control file 133 to each computer 2. The install agent distribution program 4313 is for distributing the install agent 132 to each computer 2. The registry modification program 4314 is for altering the registry 1311 of the computer 2 from a physically distant place. The shutdown program distribution program 4315 is for distributing the shutdown program 135 to each computer 2. The progress display program 4316 is for displaying the progress of the install work and the error that may occur in each computer 2. The communication program 4317 is for acquiring the information on the occurrence of an error and the progress of the install work by communication with each computer 2. The communication program distribution program 4318 is for distributing the communication program 134 to each computer 2.

Figure 9:
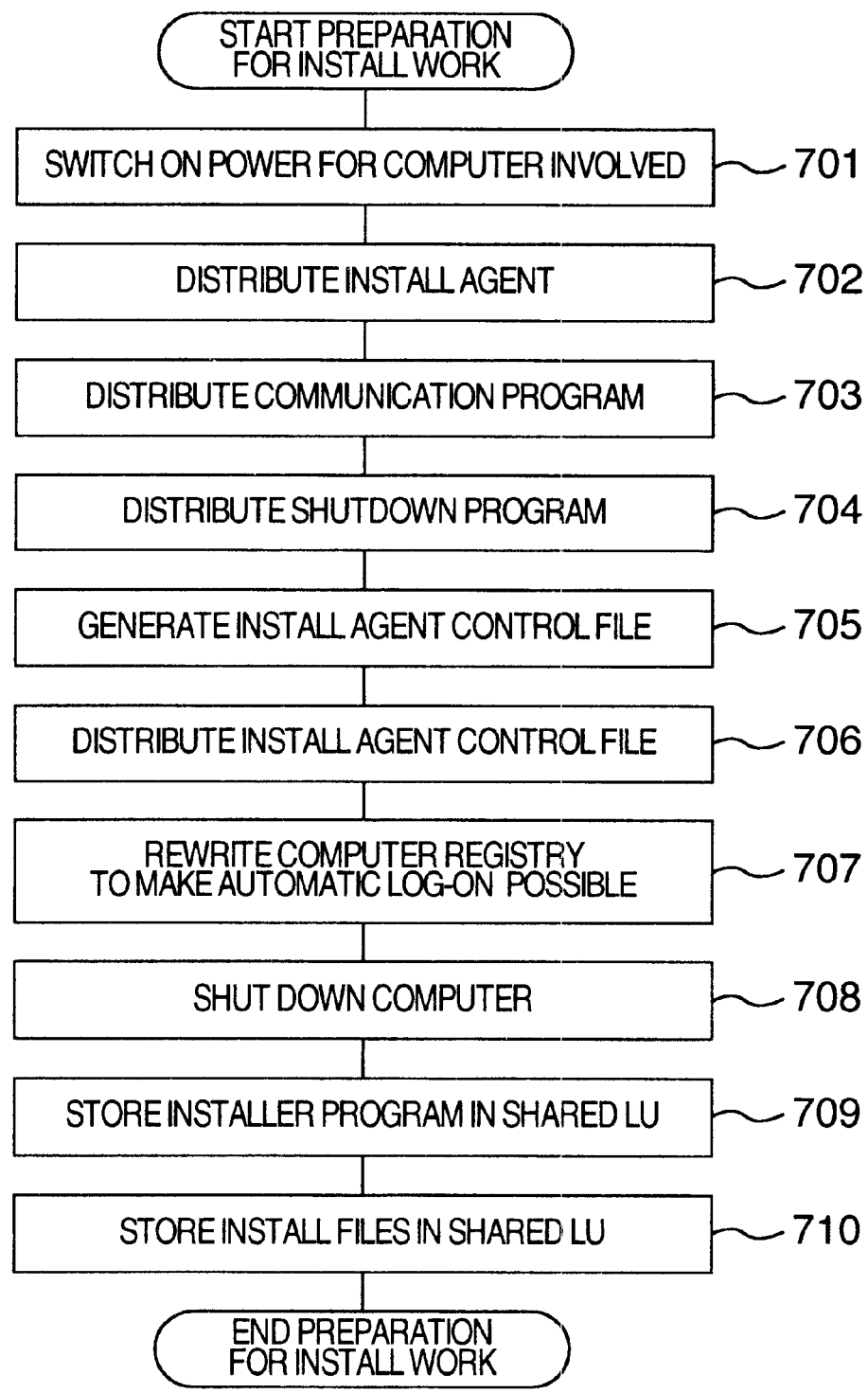
FIG. 9 is a flowchart showing the work process executed in preparation for the install.

FIG. 9 is a flowchart of the process executed in preparation for the install work.

Figure 10:
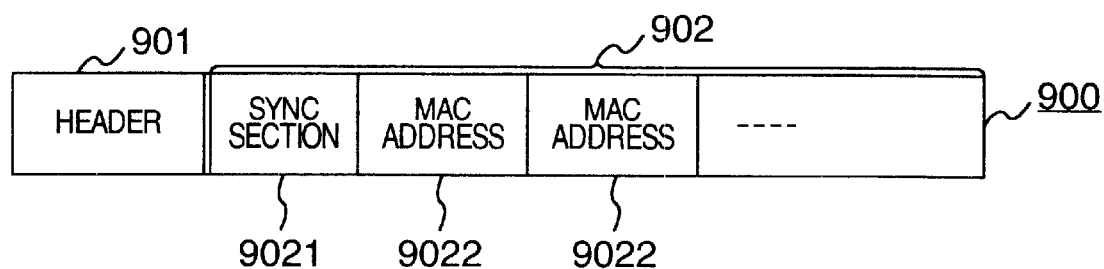
FIG. 10 is a schematic diagram showing an example of the format of a remote power-on packet.

The operator first switches on the power supply of the computer 2 in which a program is to be installed. Specifically, the install manager 431 of the management console 4 is started, and a remote power-on packet is prepared by the remote power control program 4311 and transmitted to the particular computer 2. The remote power-on packet, as an example of the format thereof is shown in FIG. 10, includes a header 901 and a data section 902. The data section 902 includes a sync field 9021 and one or a plurality of MAC addresses 9022 of the computer 2 for which the power supply is switched on. The remote power-on control means 241 on the LAN board 24 of the computer 2, upon receipt of the remote power-on packet 900, checks the MAC addresses 9022 set in the data section 902. The remote power-on control means 241 compares the MAC addresses 9022 set in the data section 902 with the MAC address of the LAN board 24, and in the case where there is a coincident address, controls the main power switch 26 thereby to switch on the power supply of the computer 2 (step 701).

Once the power supply for the computer 2 in which a program is to be installed is switched on, the install manager 431 executes the install agent program distribution program 4313 and distributes the install agent 132 to each computer 2 through the LAN 6. Each computer, upon receipt of the install agent 132, stores it in a private local LU 13. The programs distributed to the computer 2 in this or subsequent steps can be stored in the local LU 13 of each computer 2 directly from the management console 4 by mounting such a local LU 13 as a network disk in the management console 4 (step 702).

Then, the install manager 431 distributes to each computer 2 the communication program 134 by the communication program distribution program 4318 and the shutdown program 135 by the shutdown program distribution program 4315. These programs are stored in the local LU 13 like the install agent 132 (steps 703, 704).

Figure 11:
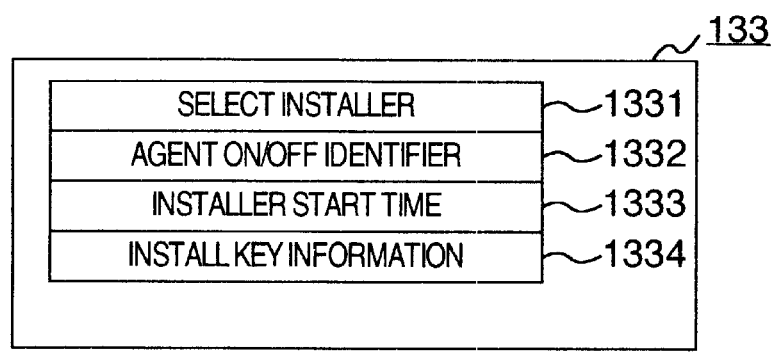
FIG. 11 is a diagram showing a structure of an install agent control file.

Then, the install manager 431 generates an install agent control file 133. FIG. 11 shows the structure of the install agent control file 133. The install agent control file 133 contains such information as a select installer 1331, an agent on/off identifier 1332, an installer start time 1333 and install key information 1334. The select installer 1331 indicates the place of storage and the name of the installer program 141 to be started by the computer 2. This information permits the computer 2 to perform the control operation as to which one of a plurality of, if any, the installer programs 141 is to be started. The agent on/off identifier 1332 is used for determining whether the install agent 132 of the computer 2 executes the install process or not. The agent on/off identifier 1332 contains the description of an on-attribute or an off-attribute. The installer start time 1333 is information for indicating the time for starting the installer program 141 to the install agent 132. The install key information 1334 is prepared for preventing an illegal installation. The install agent 132 executes the install work only when proper key information is stored. This information is used as required and not essential. The contents of the install key information 1334 will be described later (step 705).

The install manager 431 distributes to each computer 2 the install agent control file 133 according to the install agent control file distribution program 4312. This file, once distributed to each computer, is stored in the local LU 13 of the particular computer 2 (step 706).

Upon complete distribution of each program and the install agent control file, the install manager 431 modifies the registry 1311 of the computer 2 according to the registry modification program 4314 in such a manner that the computer 2 is automatically logged on and starts executing the install agent 132 (step 707). Then, the install manager 431 starts the shutdown program 135 of the computer 2 and shuts down the computer 2 according to the remote power control program 4311 (step 708).

After shutting down the computer 2 in which a program is to be installed, the install manager 431 stores the installer program 141 and the install files 142 in the shared LU 14 (steps 709, 710).

The preparatory work for installation is thus completed.

Figure 12:
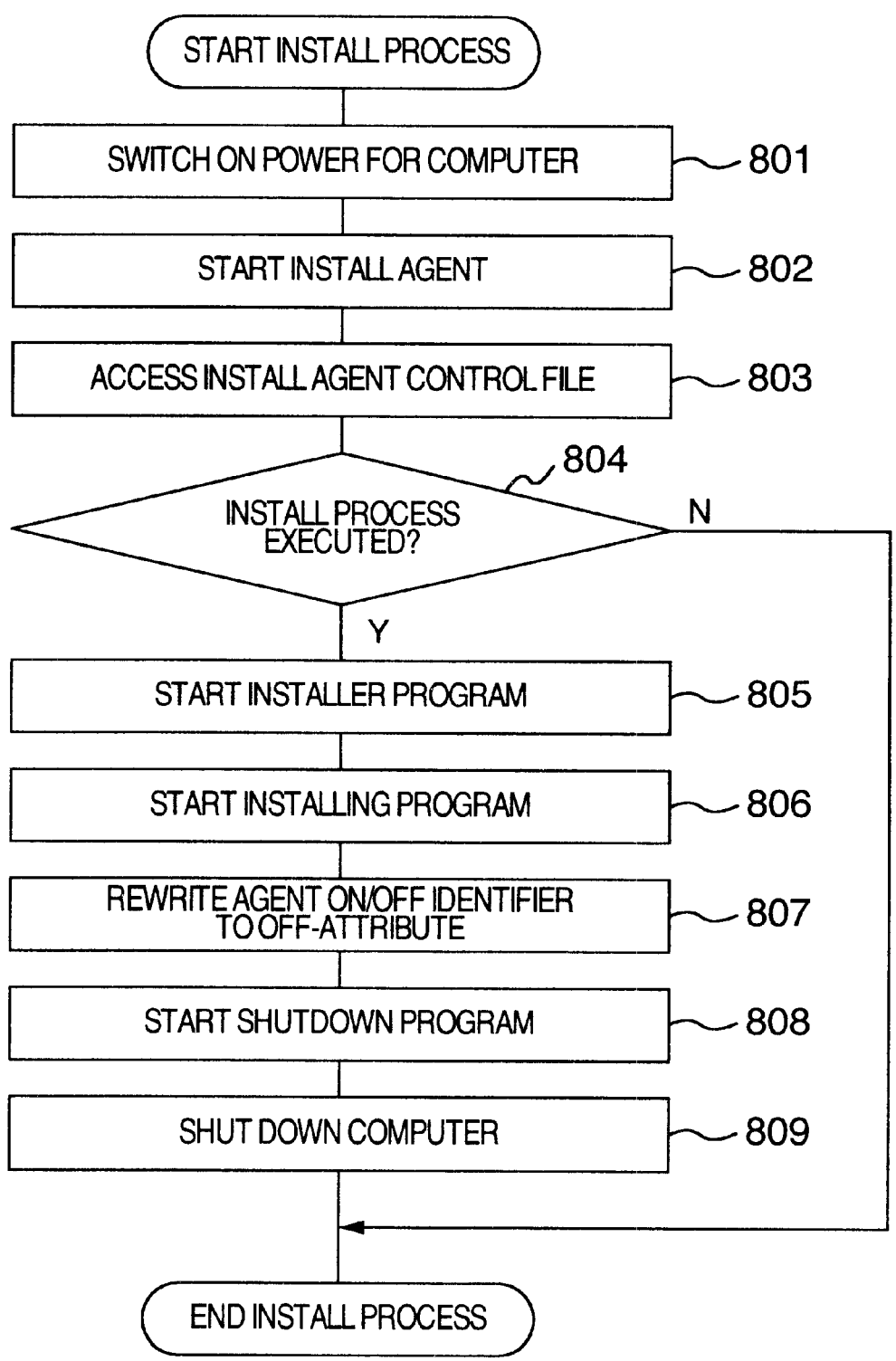
FIG. 12 is a flowchart showing the flow of the work for executing the install process.

FIG. 12 is a flowchart showing the flow of the process executed for the install work.

The operator operates the management console 4, like in step 701, to start the install manager 431 and switch on the power supply of the computer 2 for the install work according to the remote power control program 4311 (step 801).

Once the power supply is switched on, each computer 2 starts the OS 131 and is automatically logged on. Upon activation, the computer 2 starts executing the install agent 132. According to this embodiment, once the OS 131 is started, the install agent 132 is automatically started to start the work. It is also possible, however, to implement the install agent 132 as a program resident in the computer 2. In this case, the install agent 132 is instructed to start the operation from the install manager 431 by the inter-program communication (step 802).

The install agent 132 of the computer 2, once the operation is started, accesses the install agent control file 133 in the local LU 13 for the computer (step 803).

The install agent 132 checks the agent on/off identifier 1332 of the install agent control file 133. In the case where the agent on/off identifier 1332 indicates the on-attribute, the install key information 1334 is ascertained. The install key information 1334 can be, for example, the license key information issued by the developer of the program installed or the license key information issued by the developer of the install manager and the install agent. The use of these information makes it possible to check whether the program to be installed has legitimately received a license or not. It is also possible to use as the install key information 1334 the ID information such as the WWN or MAC address of the computer permitted for installation. The install agent 132 compares these information with the ID information on the computer and thus can determine whether the particular computer is permitted for installation or not. These ID information for the computer and the license key information described above can be used in combination as the install key information 1334. In the case where the agent on/off identifier 1332 is the off-attribute or the install key information 1334 is not valid, the install agent terminates the process without installing the program (step 804).

In the case where the agent on/off identifier 1332 is the on-attribute and the install key information 1334 is valid, on the other hand, the install agent 132 starts by loading in the memory 23 the installer program 141 stored in the shared LU. In the case where the time to start the installer program is designated by the installer start time 1333 of the install agent control file 133 in step 804, however, the install agent 133 withholds the starting of the installer program till the designated time.

The installer program 141, once started, installs the program. In the process, in order to reflect the install information in the registry 1311 of the computer 2, the installer program 141 reads the install files 142 into the memory 23 of the computer 2 through the fibre channel from the shared LU 14, and transfers the files to the local LU 13 (step 806).

Upon completion of the install process by the installer program 141, the install agent 132 rewrites the agent on/off identifier 1332 of the install agent control file 133 to the off-attribute so that the install process may not be performed at the time of next activation of the computer 2. At the same time, the install key information 1334 is invalidated as required (step 807).

Then, the install agent 132 starts the shutdown program 135 in the local LU 13 (step 808). The shutdown program 135, once started, shuts down the computer 2 (step 809).

Thus, the install work is completed. After that, upon activation of the computer 2 by the user, the installed program can be used. In the case where a program is installed in a plurality of computers 2, the preparatory work described above is carried out for the computers, and the power supply of the computers 2 is switched on in step 801. Then, the install process is performed in parallel on the computers.

In the program install work, the operator can desirably check how the install process is proceeding and whether the work has been completed without any error or not. According to this embodiment, the progress of the install work and the occurrence of an error are recorded in the computer status table file 136, and this file is accessed from the management console 4. Thus, the operator can check the progress and the occurrence of an error.

FIG. 13 is a diagram showing a table structure representing an example of a computer status table file 136. The computer status table file 136, as shown, has recorded therein the information indicating the work condition in the computer 2 including the power supply condition, the OS starting conditions, the operation of the install agent, the condition of the install process and the shutdown process. The computer status table file 136 has sequentially recorded therein the progress and the error occurrence for each work step during the install work. Specifically, the power supply condition and the OS starting condition are recorded according to the remote power control program 4311, the install agent condition and the install condition according to the install agent 132, and the shutdown condition according to the shutdown program 135. The value set as the status 1362 is defined as shown in FIG. 14. According to the definition of FIG. 14, it is understood from the computer status table file 136 shown in FIG. 13 that the shutdown process of the computer 2 is not started by this computer upon completion of the OS starting process, during the on state of the install agent or during the execution of the install process while the power supply is on.

The management console 4 mounts the local LU 13 as a network disk, reads the computer status table file 136 stored in each local LU 13 according to the progress indication program 4316, and displays on the input/output device 41 the work progress and the error occurrence in the computer 2 intended for install work. According to this embodiment, the computer status table file stored in the local LU 13 is accessed directly from the management console 4. As an alternative, the same information can be transferred by communication between the communication program 134 of each computer 2 and the communication program 4317 of the management console 4. In the case where an error occurs during the install work, the operator can recognize it on the management console 4, and can take the necessary action including the retrial.

According to this embodiment, a program can be installed using a fibre channel constituting a high-speed interface without the intermediary of a control unit such as a file server between the computer and the storage subsystem. As a result, the file transfer executed for the install process can be increased in speed. Also, a program can be installed in a plurality of computers in parallel at a time by one operator from the management console. As a result, the install time and the number of operators required can be reduced, thereby making it possible to reduce the operation cost for maintaining and managing the computer system. Further, in view of the fact that the management console can be located at a place physically distant from the place of the computer and the install work can be performed by remote control, the operator is not required to enter the environment in which the computer exists, and thus the security of the computer system can be improved. Furthermore, the use of the install key information prevents the illegal or erroneous install work of the computer which has not yet obtained the license. In addition, according to this embodiment, the install work can be conducted in the same procedure without regard to the type of the program installed, and therefore the install work is so simplified that a special knowledge or skill is not required for the install work.

According to this embodiment, the illegal or erroneous install work is prevented by the install agent control file. As an alternative, prior to carrying out the install work, the local LU of the computers other than the computer intended for the install work is hidden or the shared LU is hidden from the computers other than the computer intended for the install work, so that the install work for the computers other than the intended computer cannot be carried out using the function of the LUN management table 122 of the storage subsystem 1. Further, the illegal or erroneous install work can be prevented by deleting the installer program and the install files from the shared LU after completion of the install work.

Second Embodiment

Unlike in the first embodiment in which the power on control operation of each computer is performed through a LAN, a similar process can be executed without using the LAN. An explanation will be given of a second embodiment in which the install work is conducted without using the LAN.

The computer system according to the second embodiment is basically configured similarly to the computer system according to the first embodiment except that the LAN 6 is not required for the second embodiment. The explanation below, therefore, will be given with reference to the drawings used for explaining the first embodiment.

According to this embodiment, a communication LU 17 is included in the storage subsystem 1. A computer status table list indicating the status of each computer 2 is held in the communication LU 17.

Figure 15:
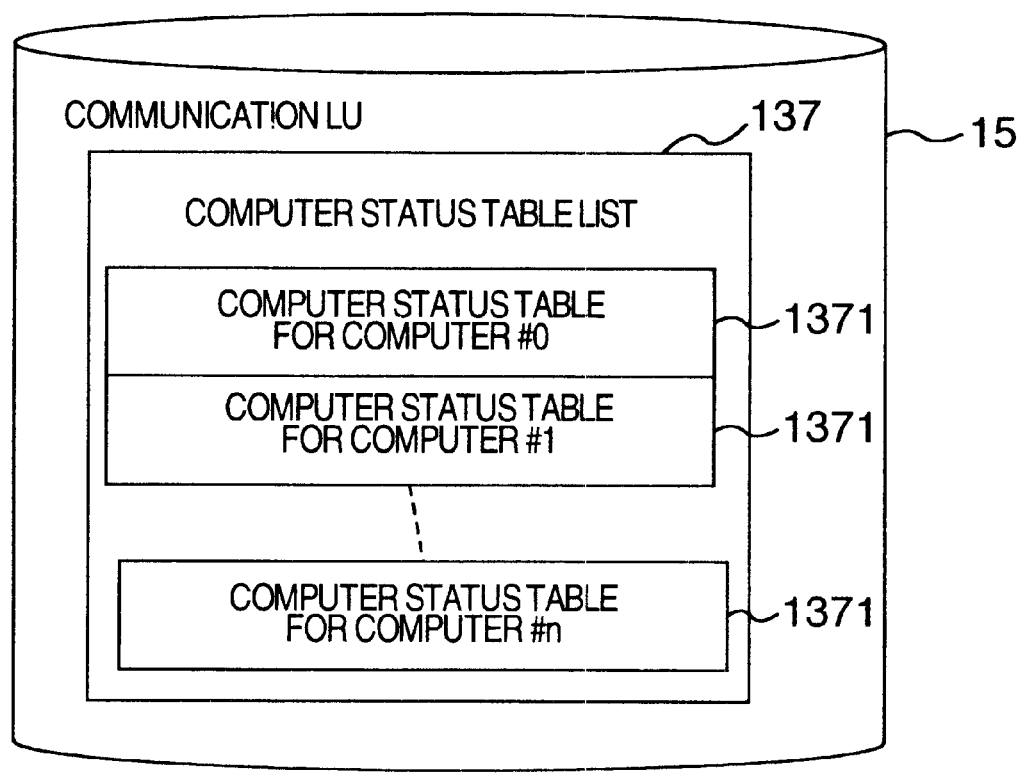
FIG. 15 is a diagram showing the structure of a computer status table list.

FIG. 15 is a diagram showing a structure of a computer status table list 137. The computer status table list 137 is a summary of the contents of the computer status table file 136 of each computer 2. The contents of the computer status table file 136 are similar to those shown in FIG. 13. The computer status table list 137 is used for notifying the management console 4 of the progress and the error occurrence in the install work conducted for each computer 2.

The computer status table list 137 is prepared according to the communication program held in each computer 2. In the table 1371 for each computer 2, an address in the communication LU 17 is uniquely determined in advance. The communication program 134 of the computer 2 is used for accessing the communication LU 17 using a RAW I/O command for directly reading/writing the logical block of the LU but not the file read/write operation using the file system. As a result, the status information can be written in the computer status table list 137 at an arbitrary timing by each computer 2. Also, the communication program 4317 constituting a subprogram of the install manager 431 of the management console 4 makes it possible to grasp the status of each computer 2 from time to time by reading the computer status table list 137 at an appropriate timing using the RAW I/O command. According to the communication program 4317 of the management console 4, data cannot be written in the computer status table list 137 unless it is clear that the install work is not yet carried out or has already been carried out for a given computer. In the case where the files can be shared by the file systems, the computer status table 136 can be accessed without using RAW I/O by constructing it as a file.

According to this embodiment, the various programs and files are distributed in the process of preparation for the install work as follows.

In this embodiment, the management console 4, like in the preparation and definition of LU, changes the WWN of the LUN management table 122 of the storage subsystem 1 by communication with the storage subsystem 1, and mounts on the management console 4 the local LU 13 of the computer 2 in which a program is to be installed. Under this condition, the management console 4 stores various programs and files in the local LU 13 of each computer 2. After storing the programs and files, the management console 4 restores the information in the LUN management table 122 to make the files thereof available for the next activation of the computer 2.

Figure 16:
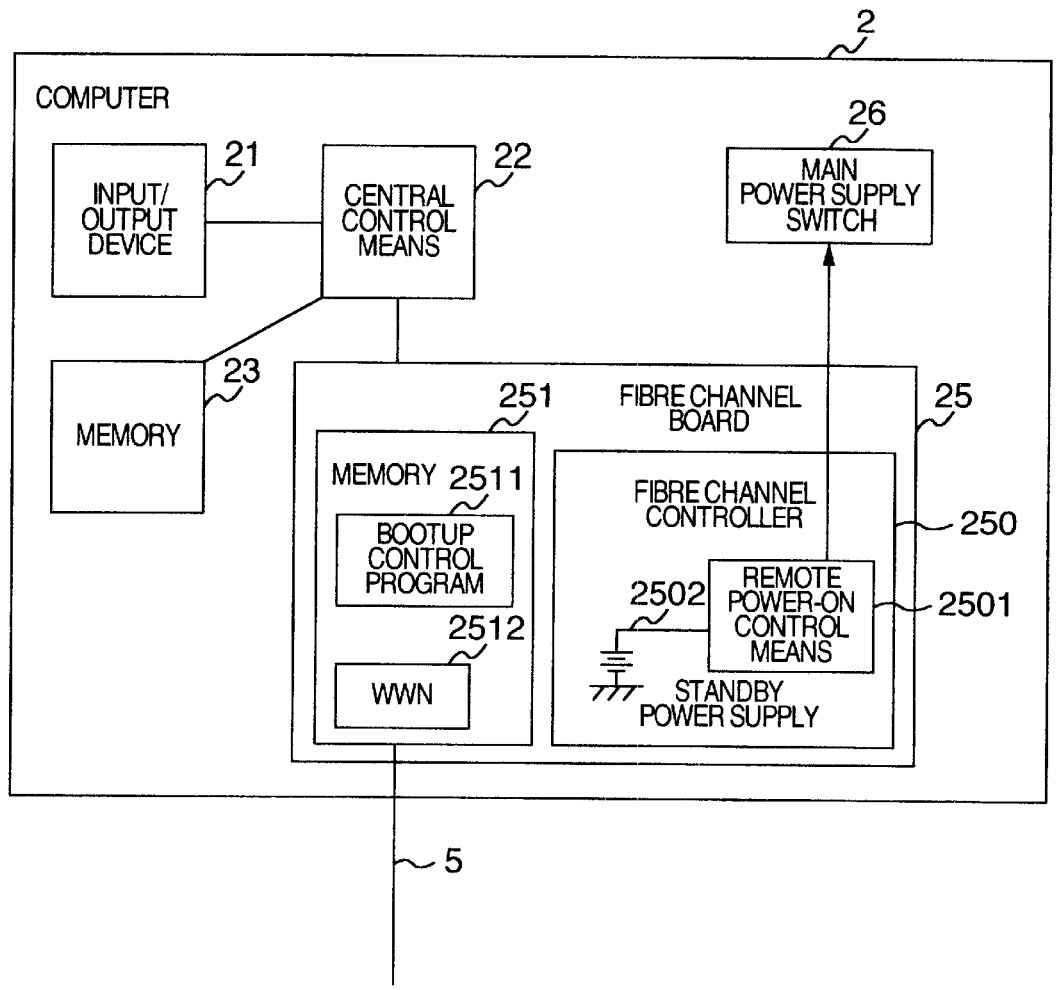
FIG. 16 is a simplified block diagram showing the configuration of a computer according to a second embodiment.

According to this embodiment, the power-on control of the computer 2 is carried out through a fibre channel. Each computer 2, therefore, as shown in FIG. 16, includes a remote power-on control means 2501 and a standby power supply 2502 on the fibre channel board 25. The LAN is not used in this embodiment, and therefore, the LAN board is not shown in FIG. 16. Nevertheless, the LAN board may be provided for other purposes.

The remote power-on control means 2501 is arranged in the fibre channel controller 250. The standby power supply 2502 is maintained in on state for supplying power to the fibre channel board 25 even while the main power supply of the computer 2 is in off state. Thus, the fibre channel controller 250 is operable and can receive the frames (packets) sent through the fibre channel 5 regardless of the state of the main power supply of the computer 2.

Figure 17:
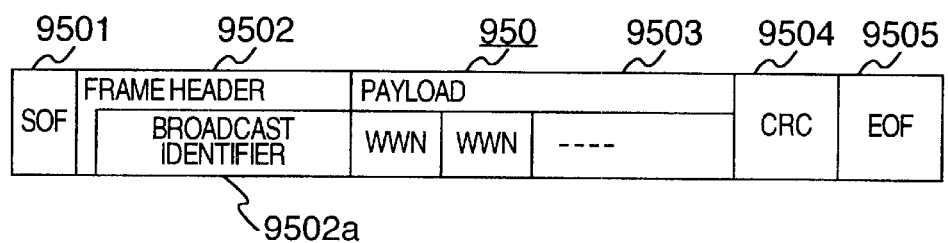
FIG. 17 is a diagram showing a format representing an example of a remote power-on frame.

FIG. 17 is a diagram showing the format of an example of the remote power-on frame used for switching on the computer 2. The frame of the fibre channel includes a SOF (start of frame) 9501 indicating the head of the frame, a frame header 9502 having such information as the transmission node of the frame and the frame type, a payload 9503 for holding the entity of the data transferred by the frame, a CRC (cyclic redundancy code) 9504 constituting a data guarantee code for detecting a bit error of the frame and an EOF (end of frame) 9505 indicating the tail end of the frame. The remote power-on frame 950 includes a broadcast identifier 9502a in the frame header 9502. The broadcast identifier 9502a indicates that the frame involved is the one issued at the same time to all the nodes connected to the fibre channel. As a result, the remote power-on frame 950 is transferred to all the devices on the fibre channel. The payload 9503 has set therein the WWN attached to the fibre channel controller 250 of the computer 2 for which the power supply is switched on.

In order to switch on the power supply of the computer 2 for which a program is to be installed in step 801 of the install process, the install manager 431 of the management console 4 prepares the remote power-on frame 950 described above according to the remote power control program 4311. The payload 9503 of the remote power-on frame 950 thus prepared has set therein the WWN of at least one computer 2 for which a program is to be installed. The remote power-on frame 950 thus generated is broadcast on the fibre channel.

The remote power-on frame 950 thus broadcast is received by the fibre channel controller 250 of each computer 2. The fibre channel controller 250, upon receipt of the remote power-on frame 950, inspects the frame header 250 thereof. In the case where the frame header 2502 contains the broadcast identifier 9502a, the payload 9503 is further inspected to check whether the WWN coincident with the WWN of its own is set or not. In the case where the WWN coincident with its own WWN is set in the payload 9503, the fibre channel controller 250 switches on the power supply of the computer 2 by controlling the main power supply switch 26 by the remote power-on control means 2501.

According to this embodiment, the install process is performed basically in a similar manner to the first embodiment except that the method of distribution of the programs and files and the method of remote power-on of the computer 2 are different.

In this embodiment, the power-on control of the computer is performed through the fibre channel and the communication is established between the computer and the management console through the communication LU 17, and therefore the install work can be carried out by remote control even in an environment lacking the LAN. Although this embodiment uses the broadcast frame of the fibre channel for power-on control, the remote power-on can be realized by transferring a remote power-on packet through the fibre channel like in the first embodiment as long as he fibre channel controller corresponds to the IP protocol.

Third Embodiment

According to the first and second embodiments, the computer 2 reads the install files from the shared LU 14 and transfers them to its own local LU 13 at the time of program install work. Now, an explanation will be given of the "direct install" in which the install work is carried out by transferring the install files without the intermediary of the computer 2.

Figure 18:
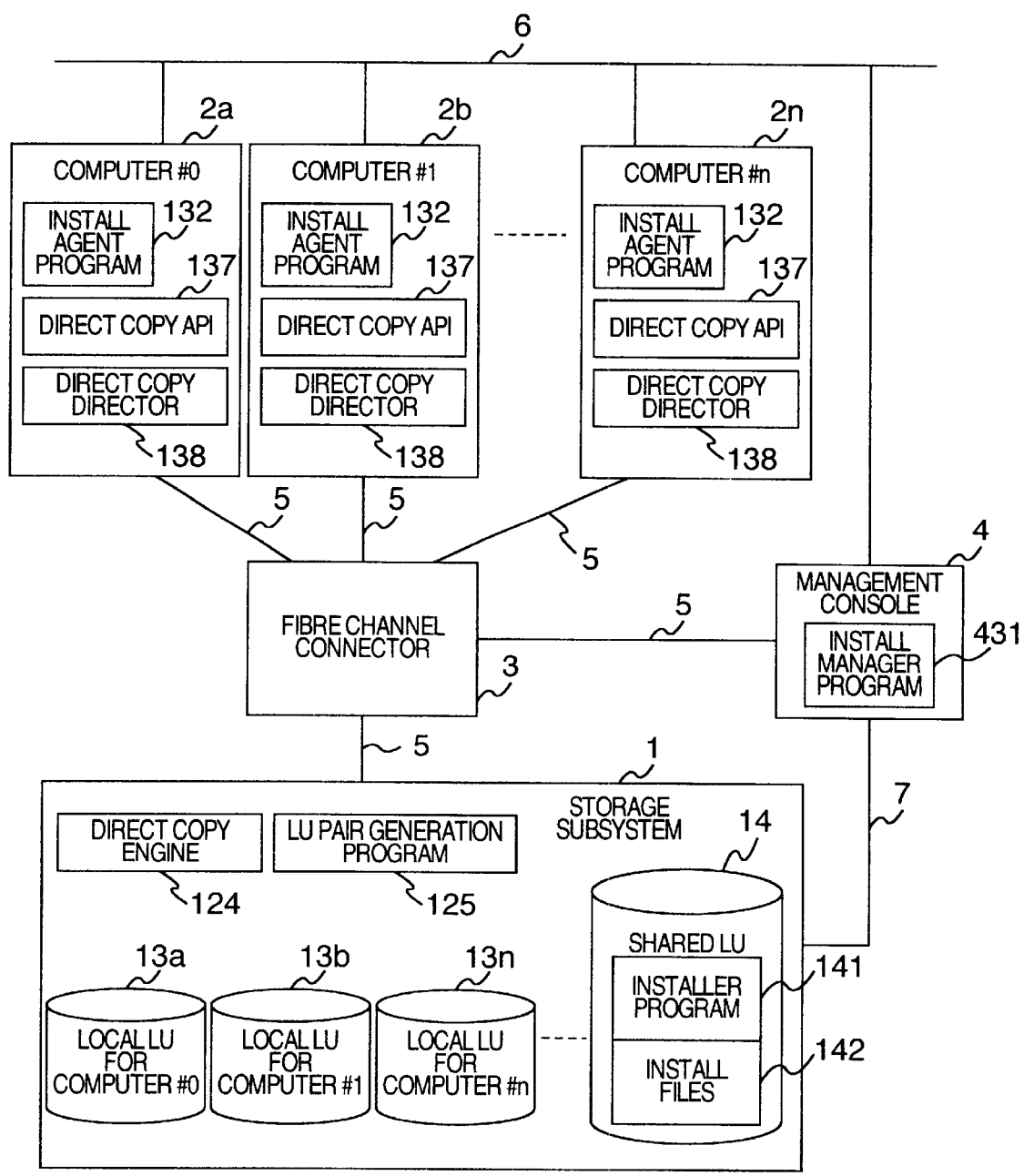
FIG. 18 is a simplified block diagram showing the configuration of a computer system according to a third embodiment.

FIG. 18 is a simplified block diagram showing a configuration of a computer system according to this embodiment. In FIG. 18, those component parts similar to the corresponding parts of the first embodiment are designated by the same reference numerals as in FIG. 1, respectively. The difference of this embodiment from the first embodiment will be mainly explained below.

The computer 2 has the function of a direct copy director 138 for giving a copy instruction to the storage subsystem 1 and the function of a direct copy API 137 which is an application program interface (API) for giving a copy instruction from the program to the direct copy director 138. These functions are stored in the private local LU 13 of each computer 2, and at the time of execution, loaded on the memory 23 and realized by the program executed by the CPU 22.

The storage subsystem 1 has a direct copy engine 124 for copying data to the destination LU from the source LU in the storage subsystem 1 in response to an instruction from the direct copy director 138. The direct copy engine 124 is stored in the memory 12 of the storage subsystem 1 and realized as a program executed by the control unit 11.

Figure 19:
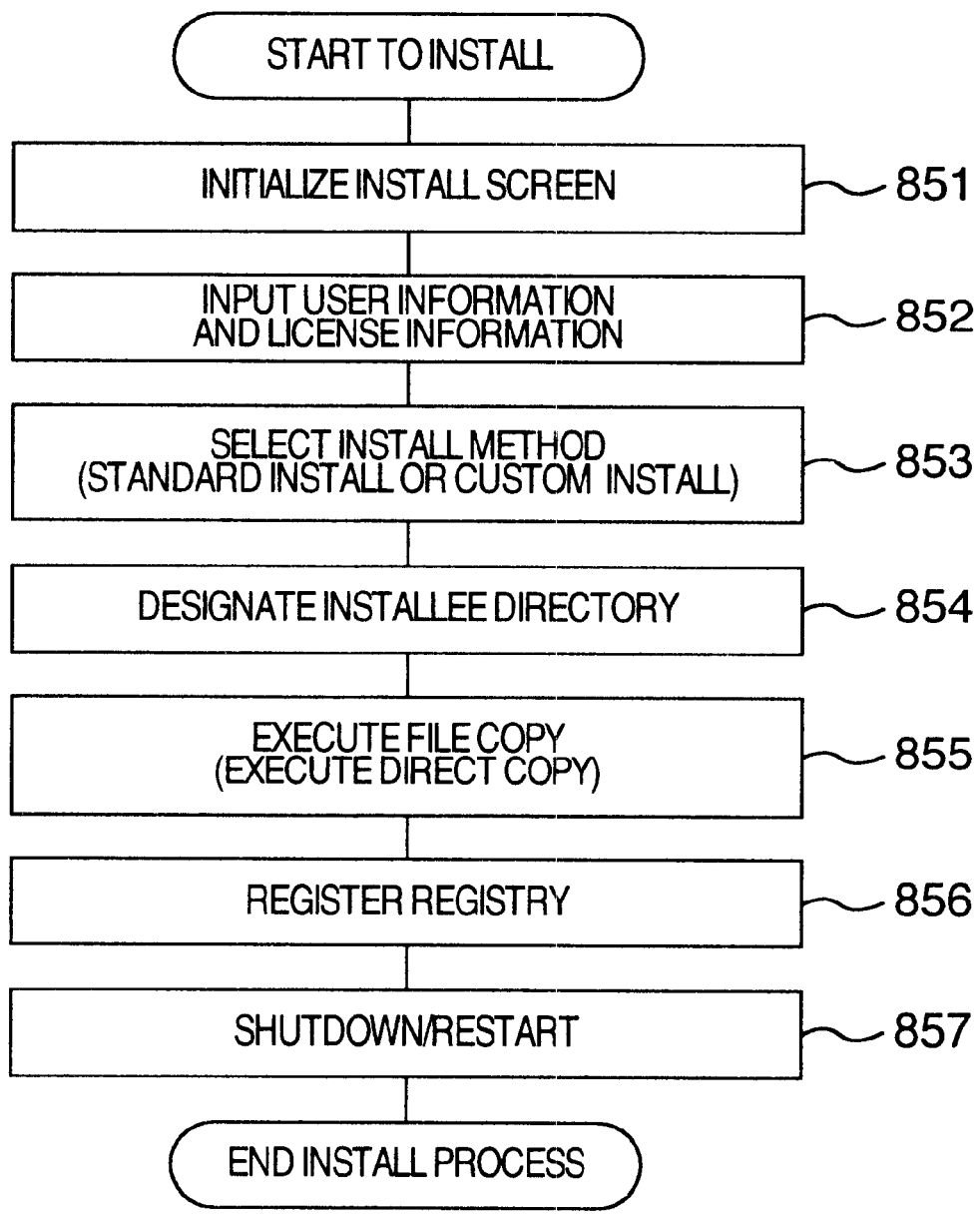
FIG. 19 is a flowchart showing the flow of the process executed by an installer program according to the fourth embodiment.

FIG. 19 is a flowchart showing the flow of the process executed by the installer program 141 according to this embodiment. The installer program 141, once the process is started, displays the title on the input/output device 21 or otherwise executes the initialization of the install screen (step 851). The installer program 141 then displays a screen for prompting the input of the user information and the license information of the program on the input/output device 21 and waits for the input of these information. Normally, the license information, etc. are input by the operator. According to this embodiment, however, like in the first embodiment, the install agent 132 performs this process on behalf of the operator (step 852). Then, the installer program 141 receives the input of selection of the install method. The install method designated in this case includes, for example, a standard install based on a predetermined file structure and setting or a custom install in which the type and structure of the program installed and the file can be set arbitrarily (step 853). The installer program 141 and the directory of the installee for storing the program to be installed are designated (step 854). The input process performed in these steps 852, 853, 854 are also performed by the install agent 132 on behalf of the operator. The install agent 132 inputs the various information described above into the installer program 141 in accordance with the information set in the install agent control file.

Based on the information set in the foregoing steps, the installer program 141 specifies the file to be copied and the directory of the installee and executes the processing of copying the file. The file copy process is executed by calling the direct copy API 137 from the installer program 141. The direct copy API 137 is given as a function described, for example, as "direct_file_copy (transferor and transferee)" on the source code of the installer program 141. In the case where the file "file 1" of the directory "dir_a" of the shared LU (assume a d drive) is copied to the directory "dir_b" of the private LU (assume a c drive), for example, "direct_file_copy(d;dir_a¥file 1, c;dir_b);" is described on the source code. In accordance with the parameter thus given, the direct copy API 137 instructs the storage subsystem 1 to copy the file through the direct copy director 138. The transfer of the file designated in accordance with this instruction is executed in the storage subsystem 1 (step 855).

Upon completion of copying all the required files, the installer program 141 executes the process for registration of the registry 1311 of the OS 131 (step 856). The install work is thus completed. After that, the installer program 141 reboots the computer as required. Also, the install agent 132, like in the first embodiment, executes the process for changing the setting of the install agent control file 133 as required thereby to complete the install process (step 857).

Now, the direct copy performed in step 906 will be explained in detail. The direct copy API 137, after being called by the installer program 141, transfers the process to the direct copy director 138. The direct copy API 137, without performing any specific process, exchanges the process between the direct copy director 138 and the application programs such as the installer program 141. The direct copy director 138, upon receipt of a direct copy request from the direct copy API 137, specifies the LU from the drive letter delivered thereto as a parameter, and based on the directory and file name of the source and the destination, the copy information including a pair of the logical address and the transfer length of the source and the destination is produced with reference to the file table information of the OS 131 generally called the file system. The copy information can be structured so that a plurality of file transfers can be requested as a list at a time. The direct copy director 138 issues the copy information list to the direct copy engine 124 of the storage subsystem 1. The direct copy engine 124, upon receipt of the copy information list from the direct copy director 138 of the computer 2, accesses the LUN management table 122 and acquires the internal LUN from the virtual LUN of the source and the destination, respectively. Then, the direct copy engine 124 generates a read command from the logical address and the transfer length of the source and a write command from the logical address and the transfer length of the destination by reference to the copy information list. The direct copy engine 124 executes the read command and the write command sequentially in the storage subsystem using the access control program. The data read in response to the read command is temporarily held in a buffer (or cacher) not shown in the storage subsystem 1. The data thus held in the buffer is written in the LU of the copy in response to the write command. The direct copy engine 124 executes the foregoing process for all the copy information in the order specified in the copy information list. Upon completion of all the copying process based on the copy information, the direct copy engine 124 reports the termination of the process to the direct copy director 138 of the computer 2.

According to this embodiment, the file copying process can be executed in the storage subsystem 1 at the time of the install work. As a result, the computer processing accompanying the copying process and the data transfer by the fibre channel are done without, so that the processing load of the computer and fibre channel for the install process can be reduced. Also, in view of the fact that a quicker copying process can be realized by the data copying in the storage system 1, the time required for the install process can be shortened.

According to the third embodiment, the direct copy engine 124 is arranged in the storage subsystem 1. As an alternative, the direct copy engine 124 can be arranged in the fibre channel connector 3. In the latter case, the fibre channel connector 3 generates a read command and a write command for copying and issues them to the storage subsystem 1. Also, the fibre channel connector 3 is required to hold the data temporarily and therefore is required to have an internal buffer. This configuration, although data flows in the fibre channel, can reduce the load on the computer like in the third embodiment described above. Further, there is no need of a special function of the storage subsystem 1 and a system can be configured of the conventional storage subsystem. Furthermore, the direct install work can be executed also in the case where the source LU and the destination LU are stored in storage subsystems physically different from each other.

Fourth Embodiment

The third embodiment utilizes the one-to-one direct copying process from one source to one destination for the copying process for the install work. According to this embodiment, on the other hand, the copying from one source to a plurality of destinations is carried out without the intermediary of the computer 2. This direct copy from one source to a plurality of destinations is called "the one-to-n direct copy".

According to this embodiment, as shown in FIG. 18, a direct copy destination LU link generation program 125 is arranged in the storage subsystem 1. The direct copy destination LU link generation program 125 relates (links) a plurality of LUs constituting copy destinations to each other.

Once a link is generated by the direct copy destination LU link generation program 125, the direct copy engine 124 carries out the one-to-n copying process in response to one copy request from the computer 2. This function permits the same program to be installed in a plurality of LUs forming a link as an internal process of the storage subsystem 1 by carrying out the install process for any one LU from the computer 2.

The operator or the manager designates the LUs (assume that the link is formed for LU-a, LU-b, LU-c, for example) linked to the storage subsystem 1 by the install manager 431. In the process, one LU is set as a representative LU. Assume that LU-a is a representative in the case under consideration. The direct copy destination LU link generation program 125 of the storage subsystem 1 forms a link for the internal LU-a, LU-b, LU-c.

While the direct copy process is executed, the direct copy director 138 of the computer 2 generates a copy information list and transmits it to the storage subsystem 1. The direct copy engine 124 of the storage subsystem 1, upon receipt of the copy information list, accesses the LUN management table 122, determines the internal LUN from the virtual LUN of the copy source and the copy destination, respectively. In the copy information list, only the representative LU is designated as a copy destination. The direct copy engine 124 accesses the copy information list, so that a read command is generated from the logical address of the source and the transfer length and a write command of the same contents for all the LUs (LU-a, LU-b, LU-c) for which a link is formed from the logical address of the copy destination and the transfer length. Then, the direct copy engine 124 executes the read command using the access control program and reads the data temporarily into the buffer in the storage subsystem 1. After that, the data read into the buffer is written in a plurality of LUs linked by the write command.

The process described above makes it possible to install a program in a plurality of LUs at a time. Also, according to this embodiment, like in the third embodiment, the direct copy engine 124 and the direct copy destination LU link generation program 125 can be arranged in the fibre channel connector 3 thereby to realize these processes as a function of the fibre channel.

Also, according to this embodiment, a plurality of copy destination LUs are designated in advance by the direct copy LU link generation program 125. As an alternative, the functions of the direct copy API can be expanded thereby to use the API for realizing the one-to-n direct copy. Such an API can be described as a function such as "direct_file_copy_n (number of copy destination LUs, transferor, transferee 1, transferee 2, . . . , transferee n);". In this case, the direct copy director 138 transmits information on a plurality of the LUs linked as a part of the copy information list to the direct copy engine 124. As a result, the 1-to-n direct copy can be realized without link designation in advance.

Fifth Embodiment

Figure 20:
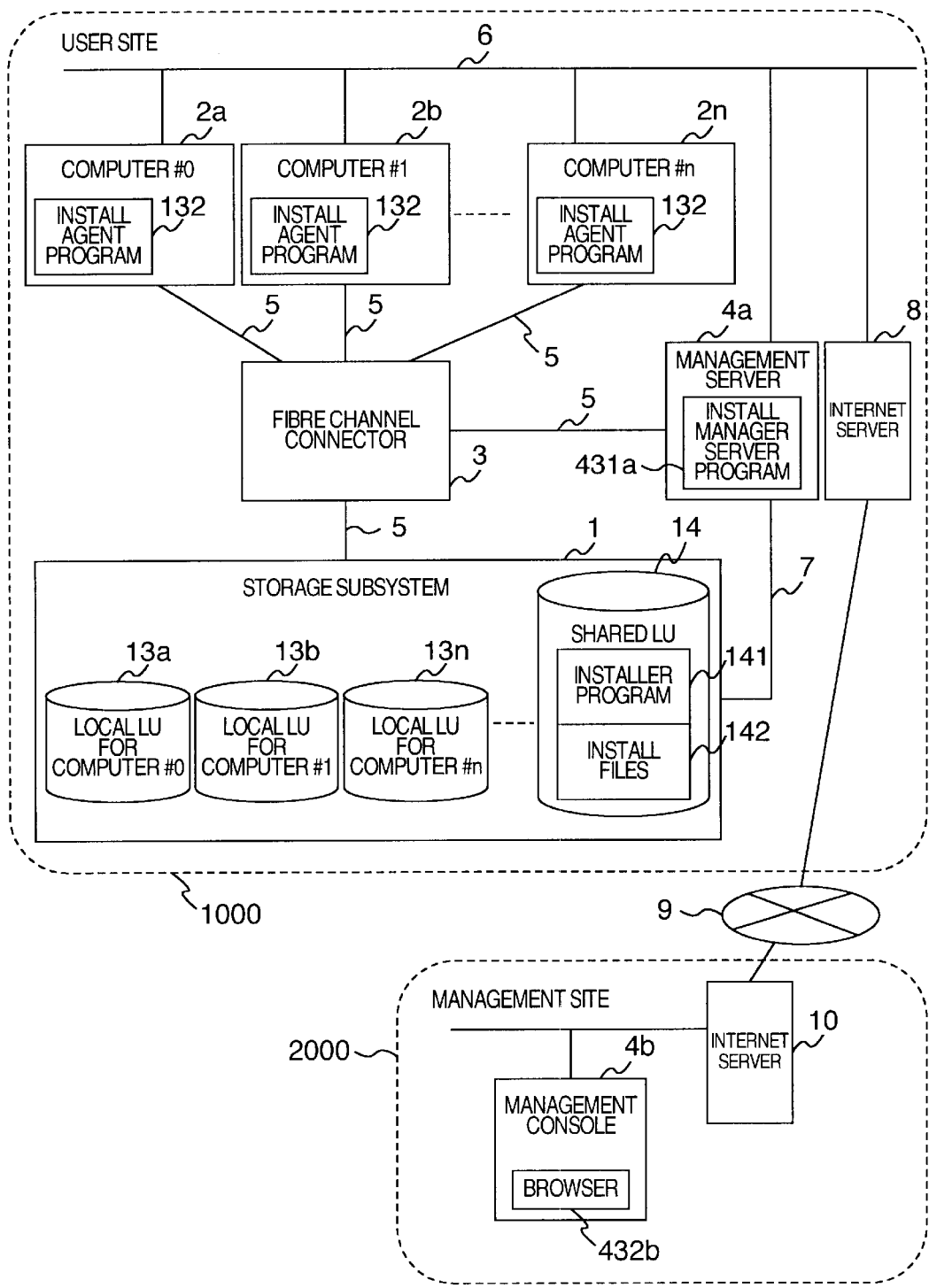
FIG. 20 is a simplified block diagram showing the configuration of a computer system according to a fifth embodiment.

In the first to fourth embodiments described above, the storage subsystem 1 is connected to the management console 4 through the fibre channel 5. Therefore, the management console 4 and the storage subsystem 1 cannot be arranged beyond the distance connectable by the fibre channel. Under the circumstances, the connectable distance of the fibre channel is 10 km, and in each of the embodiments described above, a program cannot be installed from a remote place farther than this distance. □ A method of realizing the program install work from a farther place will be explained below as a fifth embodiment. FIG. 20 is a simplified block diagram showing a configuration of a computer system according to the fifth embodiment. In FIG. 20, a user site 1000 having a computer system comprising computers 2 for which a program is to be installed and a management site 2000 where a manager performs the install operation are arranged at physically distant places from each other.

A computer system basically similar to that of the first embodiment is arranged in the user site 1000. The computer system in the user site 1000 is different from the computer system according to the first embodiment in that it comprises a management server 4a in place of the management console 4 and an internet server 8 is connected to a LAN 6. On the other hand, a management console 4b and an internet server 10 connected to the management console 4b are arranged in the management site 2000. The internet server 8 and the internet server 10 are connected to each other communicably through an internet 9 constituting a wide area network.

The management server 4a in the user site 1000 is basically similar to the management console 4 according to the first embodiment, and is operated from the management site 2000 through the internet 9. An install manager server program (hereinafter referred to as the install manager server) 431a has the function as a server for the management console 4b of the management site 2000 in addition to the function as the install manager 431 according to the first embodiment.

The management console 4b is a terminal device such as a PC which communicates with the management server 4a through the internet 9, displays various operation screens or operates on a browser program (hereinafter referred to as the browser) 432b for receiving the various operations of the manager.

The remaining component parts of this embodiment are similar to the corresponding parts of the first embodiment and will not be explained below.

Now, the install process according to this embodiment will be explained primarily with reference to the difference from the first embodiment. Assume that the various settings of LU have been completed and the install manager server 431a is already operating on the management server 4a.

Before installing the program, the required files are transferred to the management server 4a in advance from the management site 2000. The required files include the install agent 132, the install agent control file 133, the communication program 134, the shutdown program 135, the installer program 141 and the install files 142. These files are transferred using a transfer protocol such as the file transfer protocol (ftp). These files are stored temporarily in the local disk device of the management server 4a. The manager sets various data in the install agent control file 133 for each computer using the management console 4b in advance.

The program install operation is performed by activating the browser 432b on the management console 4b and accessing the install manager server 431a through the internet 9. The specific contents of the process performed for the install work are similar to those of the first embodiment shown in FIGS. 9 and 12 except that the operation of the install manager server on the management server 4a is performed through the internet.

While the program is being installed, the management server 4a accesses the computer status table file 136 of each computer 2. Thus, the progress of the work and the error occurrence in each computer 2 in which a program is being installed are transmitted to the management console 4b through the internet 9 according to the progress display program 4316. The work progress and the error occurrence sent by the browser 432b are displayed on the display unit of the management console 4b.

According to this embodiment, there is no restraint of the physical distance between the management console operated by the manager and the place where the computer in which the program is to be installed is located, and the install work can be realized by centralized control from a remote place. Also, the configuration of the user site 1000 and the install work according to this embodiment, which are similar to those of the first embodiment, can be based on the corresponding user site and the install work of the second to fourth embodiments with equal effect.

Sixth Embodiment

The fifth embodiment described above refers to a method for the activation control and the management of the monitoring of the progress of the install work from a remote place. A sixth embodiment will be explained below, on the other hand, by referring to the case in which the centralized file transfer for the install work is carried out from a remote place.

Figure 21:
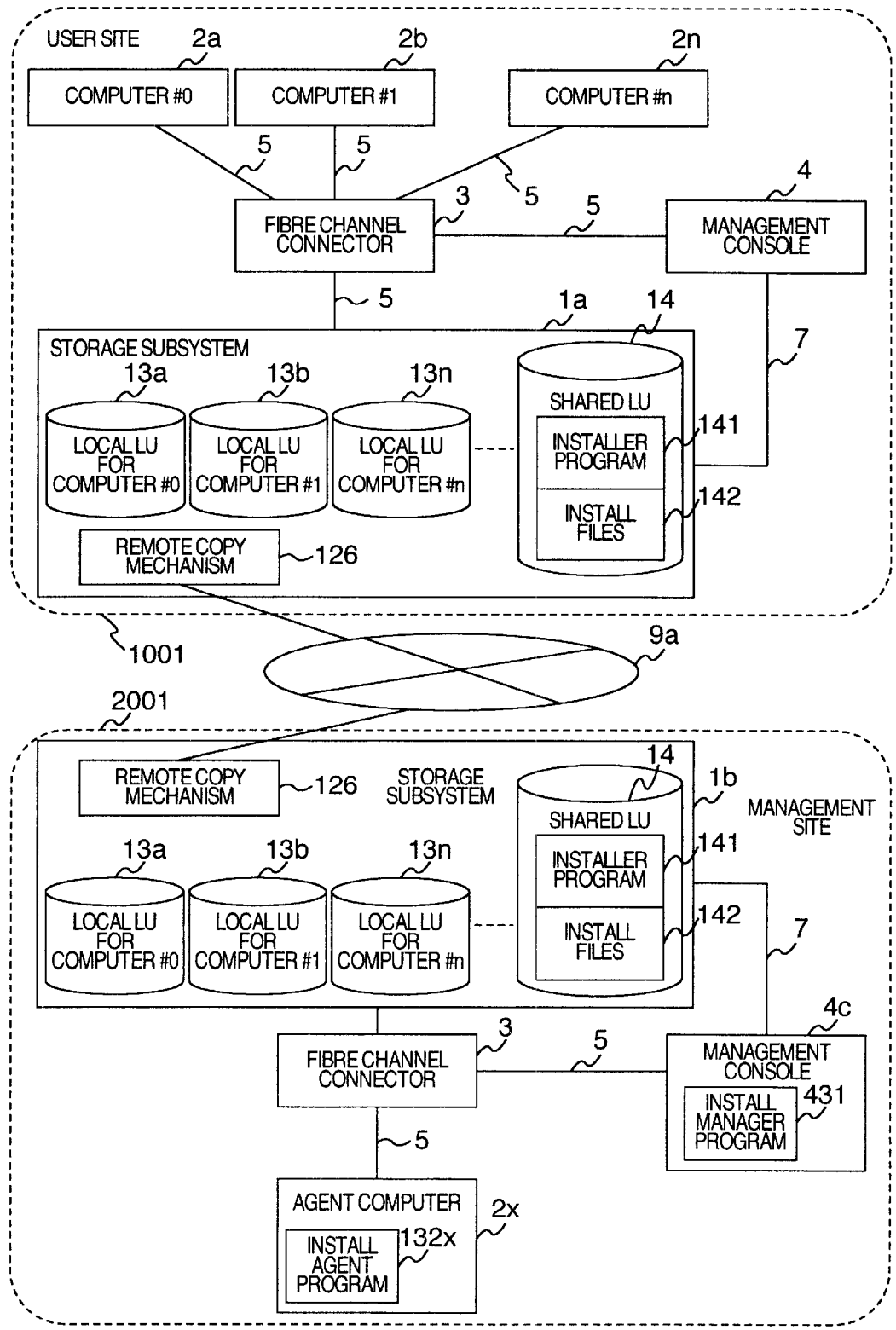
FIG. 21 is a simplified block diagram showing the configuration of a computer system according to a sixth embodiment.

FIG. 21 is a simplified block diagram showing a configuration of a computer system according to the sixth embodiment. A user site 1001 and a management site 2001 are arranged at places physically distant from each other. A computer system having computers in which a program is to be installed is arranged in the user site 1001. The computer system of the user site 1001 has a configuration similar to that of the first embodiment. The storage subsystem la of the user site 1001, however, has the remote copy function 126 described later in addition to the functions of the storage subsystem 1 in the first embodiment. The management site 2001 includes an agent computer 132x, a storage subsystem 1b and a management console 4c. The agent computer 132x, the storage subsystem 1b and the management console 4c are interconnected through a fibre channel connector 3. The storage subsystem 1b included in the management site 2001 has a configuration similar to the storage subsystem 1a. The storage subsystem 1a and the storage subsystem 1b are interconnected through a broad band communication path 9a implemented by a network such as an internet, a public telephone network, an ATM network or a fibre channel. The storage subsystem 1a and the storage subsystem 1b, which are connected directly in FIG. 21, may alternatively be connected through a connector such as a gateway or a router.

The remote copy function 126 is for transferring the data to other storage subsystems through the broad band communication path 9a. Once data is written in the storage subsystem 1b of the management site 2001 from the management console 4c, for example, the write data is stored in the disk unit (LU) in the storage subsystem 1b while at the same time transferring the same write data to the storage subsystem 1a of the user site 1001 through the broad band communication path 9a by the remote copy function 126. The storage subsystem 1a, on the other hand, receives the write data by the remote copy function 126, writes the same write data in the corresponding disk unit (LU) in the storage subsystem 1a and transmits a termination report to the storage subsystem 1b. The storage subsystem 1b returns the termination report to the management console 4c at the time point when the write process is complete in the storage subsystem 1b (in the case of synchronous remote copy) or at the time point when the write process is completed in both the storage subsystem 1a and the storage subsystem 1b (in the case of asynchronous remote copy). Prior to the execution of remote copy, the corresponding LUs of the storage subsystems 1a, 1b are required to be determined in pairs. Also, prior to the execution of the write process, the initial copy operation is required to be executed for completely copying the data in one LU to the other LU in order to match the data. These control operation and data transfer are all carried out by the remote copy function 126.

The install process utilizing the remote copy function will be explained below. For facilitating the understanding, it is assumed that a program is installed in a single computer 2. In the description that follows, it is also assumed that the LU configuration of the storage subsystems of the user site 1001 and the management site 2001 are the same and each constitute a pair with a corresponding LU.

In preparation for the install work according to this embodiment, the contents of a local LU 13 for the computer 2 for which the install work is intended are copied to a corresponding LU 13 (hereinafter referred to as the mirror LU) in the storage subsystem 1b so that both the contents may coincide with each other. The mirror LU of which the contents have coincided is mounted on the agent computer 2x as a local LU. The install manager 431 of the management console 4c, like in the 14th embodiment, distributes various files to the shared LU 14 of the storage subsystem 1b of the management site 2001 and the local LU (mirror LU) of the computer 2x. In distributing the files, a write access occurs to the shared LU and the mirror LU in the storage subsystem 1b. In the process, the remote copy function 126 of the storage subsystem 1b transfers the data to the corresponding LU in the storage subsystem 1a of the user site 1001. As a result, the result of file distribution in the management site 2001 is reflected in the storage subsystem 1a of the user site 1001.

In executing the install work, a program is installed in the local LU 13 (mirror LU) using the agent computer 2x by the management site 2001 like in the first embodiment. As in the preparatory work described above, the data written in the mirror LU by the install process is written in the local LU 13 of the user site 1001, with the result that a program is installed in the computer 2 of the user site 1001. The coincidence of data between the storage subsystem 1aand the storage subsystem 1b is guaranteed by the remote copy function 126, and therefore once the install work in the management site 2001 is successful, it follows that the install work in the user site 1001 also succeeds.

As described above, according to this embodiment, the install work including the file transfer as well as various setting can be carried out from a remote place. If the setting for individual computers is required in the user site, it can be done using the same method as in the fifth embodiment. Also, it is possible to prepare in the management site a plurality of agent computers corresponding to a plurality of the computers for which a program is to be installed in the user site, and the install work can be conducted using the agent computers. The install work for a plurality of computers can also be performed in parallel.

Further, by application of the one-to-n direct install process described in the fourth embodiment, a plurality of computers can be installed by one agent computer. In similar fashion, by performing the remote copy process between the storage subsystem of the management site and the storage subsystems of a plurality of user sites, the install process for a plurality of user sites can be performed at the same time by the install work in a single management site. However, these methods, according to which the initial copy cannot be accomplished for all the LUs, are effective in the case where the coincidence of the contents of all the LUs is desired such as for the new system install work including the Os.

Furthermore, according to this embodiment, the install process is executed using the remote copy function. It is possible, on the other hand, to implement the install work by copying, as a repeated initial copy, the contents of the LU of the management site to the LU of the user site after rendering the contents of the LUs of the user site and the management site to coincide with each other. Also, for simplifying the management site, the management site may be configured with an agent computer and a storage subsystem connected thereto. In such a case, a program is installed in the agent computer of the management site by the same method as in the prior art, thereby making it possible to realize the work of installing a program in the computers in the user site using the remote copy function.

It will thus be understood from the foregoing description that according to this invention, there is provided a computer system in which a program can be installed in the computers efficiently for a reduced operation cost required for maintenance and management of the computer system.

What is claimed is:

1. In a computer system comprising:
   a first computer, a second computer, a management computer operated by an operator to install a target program and a storage system coupled to said first computer, said second computer and said management computer, wherein said storage system includes a shared logical unit accessed by each of said first computer, said second computer, and said management computer, a first logical unit accessed by said first computer, and a second logical unit accessed by said second computer;
   an install method of installing a target program to be installed for said first computer and said second computer, comprising the steps of:
      controlling said first computer and said second computer from said management computer to start a process executed by an install agent of each of said first computer and said second computer;
      loading an installer program stored in said shared logical unit into each of said first computer and said second computer by the install agent;
      installing, according to the installer program on said first computer, said target program for said first computer by controlling transfer of said target program stored in said shared logical unit to said first logical unit; and
      installing, according to the installer program on said second computer, said target program for said second computer by controlling transfer of said target program stored in said shared logical unit to said second logical unit; and
      so that said first computer can use said target program stored in said first logical unit and said second computer can use said target program stored in said second logical unit.

2. An install method according to claim 1, wherein each of said first computer and said second computer uses a logical unit number for accessing a logical unit in said storage system and executes a program in the logical unit.

3. An install method according to claim 2, further comprising the steps of:
   before controlling said first computer and said second computer:
      storing said file related to said target program in said shared logical unit by said management computer, and storing the install agent and a control file used by the install agent in said first logical unit and said second logical unit.

4. An install method according to claim 3, wherein said control file includes the information for identifying said installer program and the information indicating the place where said installer program is stored.

5. An install method according to claim 4, further comprising the step of:
setting the install agent of each of said first computer and said second computer to start at the time of activating of each of said first computer and said second computer from said management computer.

6. An install method according to claim 5, wherein before loading an installer program, switching on the power supply of each of said first computer and said second computer under the control of said management computer.

7. An install method according to claim 6, wherein said control file includes the ID information indicating whether the install work is to be carried out or not, and said install method further comprises the step of:
determining whether the install agent of each of said first computer and said second computer conducts the install work based on said ID information.

8. An install method according to claim 2, wherein said control file includes key information for permitting said target program to be installed.

9. An install method according to claim 6, wherein said install method further includes the step of: determining whether said target program is to be installed for each of said first computer and said second computer according to said key information.

10. An install method according to claim 9, wherein said key information contains an identifier of a computer for which said target program is permitted to be installed, and said substep of determining whether said target program is to be installed includes the substep of comparing the identifier of each of said first computer and said second computer with the identifier contained in said key information.

11. An install method according to claim 10, wherein said identifier is a unique address information assigned to the controller board of a computer for coupling to said storage system via a network.

12. An install method according to claim 1, further comprising the step of:
obtaining information indicating the condition of the process for installing said target program by said management computer.

13. An install method according to claim 12, wherein said information indicating the condition of the process for installing said target program is given through a logical unit included in said storage system.

14. An install method according to claim 1, wherein the step of installing said target program for said first computer includes the substeps of:
transferring a file copy request from said first computer to said storage system; and
copying said target program from said shared logical unit to said first logical unit in response to said file copy request by said storage system, and
wherein the step of installing said target program for said second computer includes the substeps of:
transferring a file copy request from said second computer to said storage system, and
copying said target program from said shared logical unit to said second logical unit in response to said file copy request by said storage system.

15. An install method according to claim 1, wherein said first computer, said second computer and said storage system are coupled to each other through a connector, and
wherein the step of installing said target program for said first computer includes the substeps of:
transferring a file copy request from said first computer at to said connector, and
copying said target program from said shared logical unit to said first logical unit in response to said file copy request by said connector, and
wherein the step of installing said target program for said second computer includes the substeps of:
transferring a file copy request from said second computer to said connector, and
copying said target program from said shared logical unit to said second logical unit in response to said file copy request by said connector.

16. In a computer system comprising a first computer system including a first computer and a first storage system coupled to said first computer and a second computer system including a second computer, a management computer operated by the operator for installing a target program for said first computer, and a second storage system coupled to said management computer and said second computer, said first storage system and said second storage system being coupled to each other through a network,
wherein said first storage system includes a first logical unit accessed by said first computer, and said second storage system includes a shared logical unit accessed by computers in said second computer system and a second logical unit accessed by said second computer,
an install method for installing a target program for said first computer, comprising the steps of:
controlling said second computer from said management computer to start the process of the install agent of said second computer;
loading an installer program stored in said shared logical unit into said second computer according to said install agent;
installing, according to said installer program, said target program for said second computer by controlling transfer of said target program stored in said shared logical unit to said second logical unit; and
installing, according to said installer program, said target program for said first computer by controlling transfer of said target program stored in said second logical unit from said second storage system to said first storage system and storage of said target program in said first logical unit, said first logical unit corresponds to said second logical unit.

17. An install method according to claim 16, further comprising the step of copying data stored in said second logical unit to said first logical unit before transferring said target program from said second storage system to said first storage system.

18. A computer system comprising:
a first computer;
a second computer;
a management computer operated by the operator to install a target program for said first computer and said second computer;
a storage system coupled to said first computer, said second computer and said management computer, said storage system including a shared logical unit, a first logical unit, and a second logical unit,
wherein said shared logical unit is shared and accessed by said first computer and said second computer, and storing the target program to be installed for said first computer and said second computer and an installer program for executing the process of installing said target program, said first logical unit for storing an install agent executed by said first computer and a control file accessed by said install agent, and said second logical unit for storing an install agent executed by said second computer and a control file accessed by said install agent; and an install manager operated on said management computer for controlling the start of the process executed by the install agent of each of said first computer and said second computer, wherein said installer program stored in said shared logical unit is loaded to each of said first computer and said second computer, the installer program is executed by each of said first computer and said second computer, and the installer program controls transfer of said target program from said shared logical unit to each of said first logical unit and said second logical unit, so that said first computer can use the target program stored in said first logical unit and said second computer can use the target program stored in said second logical unit.

19. A computer system according to claim 18, wherein said install agent starts an installer program in accordance with the contents of said control file.

20. A computer system according to claim 19, wherein the installer program of said first computer reads the target program from said shared logical unit and transfers said target program to said first logical unit;

and the installer program of said second computer reads the target program from said shared logical unit and transfers said target program to said second logical unit in order to install said target program for said first computer and said second computer.

21. A computer system according to claim 20, wherein each of said first computer and said second computer includes a power control circuit for controlling the on/off operation of a power supply from an external source, and said install manager controls the starting of the process of said install agent of each of said first computer and said second computer by instructing said power supply control circuit of each of said first computer and said second computer to switch on the power supply.

22. A computer system according to claim 21, wherein said the target program and said installer program are stored in said shared logical unit by said management computer, and said install agent and said control file are stored in each of said first logical unit and said second logical unit by said management computer.

23. A computer system according to claim 22, wherein said control file includes the ID information for identifying said installer program to be started by the install agent and the information indicating the place where said installer program is stored.

24. A computer system according to claim 23, wherein said control file includes the install start information indicating whether the install work is to be executed or not, and said install agent determines whether the process is to be executed with reference to said install start information before starting the process.

25. A computer system according to claim 22, wherein said control file includes key information for permitting a target program to be installed, and the install agent accesses said key information at the time of starting the process and starts the process in the case where the install work is permitted by said key information.

26. A computer system according to claim 23, wherein each of said first computer and said second computer includes the address information assigned uniquely thereto, and said key information includes address information of a computer for which the target program is permitted to be installed.

27. A computer system according to claim 26, further comprising a connector for connecting said first computer, said second computer and said storage system, and wherein said address information is an address assigned to an interface of each of said first computer and said second computer for connecting to said connector.

28. A computer system according to claim 18, wherein said management computer includes a management server operated by said install manager and a management console connectable to said management server through a network and having an input/output device operated by said operator.

* * * * *